US011159851B2

(12) United States Patent
Stern et al.

(10) Patent No.: US 11,159,851 B2
(45) Date of Patent: Oct. 26, 2021

(54) APPARATUS AND METHODS FOR PROVIDING ENHANCED OR INTERACTIVE FEATURES

(71) Applicant: Time Warner Cable Enterprises LLC, St. Louis, MO (US)

(72) Inventors: Peter Stern, Riverside, CT (US); Asheesh Saksena, Warren, NJ (US); Robert Gazdzinski, San Diego, CA (US); Julie Melendez, Austin, TX (US); Mark Wang, San Diego, CA (US); James Gutierrez, San Diego, CA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 4 days.

(21) Appl. No.: 16/435,229

(22) Filed: Jun. 7, 2019

(65) Prior Publication Data
US 2019/0356960 A1 Nov. 21, 2019

Related U.S. Application Data

(62) Division of application No. 13/619,951, filed on Sep. 14, 2012, now abandoned.

(51) Int. Cl.
*H04N 21/472* (2011.01)
*H04N 21/454* (2011.01)
(Continued)

(52) U.S. Cl.
CPC ..... *H04N 21/47202* (2013.01); *H04N 21/254* (2013.01); *H04N 21/26258* (2013.01);
(Continued)

(58) Field of Classification Search
CPC ......... H04N 21/47202; H04N 21/4788; H04N 21/26258; H04N 21/454; H04N 21/44222; H04N 21/4784; H04N 21/254
See application file for complete search history.

(56) References Cited

U.S. PATENT DOCUMENTS 5,410,344 A 4/1995 Graves et al.
5,528,284 A 6/1996 Iwami et al.
(Continued)

FOREIGN PATENT DOCUMENTS

EP 1821459 A1 8/2007
EP 2081361 A1 7/2009
(Continued)

OTHER PUBLICATIONS

Alcatel: "Delivering True Triple Play-Common Capabilities for the Delivery of Composite Services", Internet Citation, Jun. 2006 (Jun. 2006), XP002418653, Retrieved from the Internet: URL:http://www.alcatel-lucent.com/tripleplay [retrieved on Feb. 6, 2007].
(Continued)

*Primary Examiner* — Anthony Bantamoi
(74) *Attorney, Agent, or Firm* — Gazdzinksi & Associates, PC

(57) ABSTRACT

Apparatus and methods for providing enhanced or interactive features over a network. In one embodiment, the exemplary apparatus and methods leverage extant high-bandwidth capabilities of a managed network, and are implemented to enable a user to create a playlist of content, clips, advertisements, from among currently broadcast content, stored content, user generated content, web or other network content. The user can upload user-generated or other content to the network such as for selection into a playlist at higher rates using a network operator-provided wireless dongle. Additional interactive features include, among other, enhancements which enable user participation
(Continued)

individually or with other subscribers in live or recorded content-based group activities (such as e.g., cooking, exercising, group viewing, dating, and learning/teaching). Further interactive gaming and couponing options are also provided. Still further, the present apparatus and methods may be used to provide general public use wireless access from existing private user devices.

24 Claims, 15 Drawing Sheets

(51) Int. Cl.
*H04N 21/442* (2011.01)
*H04N 21/4784* (2011.01)
*H04N 21/254* (2011.01)
*H04N 21/4788* (2011.01)
*H04N 21/262* (2011.01)

(52) U.S. Cl.
CPC ..... *H04N 21/44222* (2013.01); *H04N 21/454* (2013.01); *H04N 21/4784* (2013.01); *H04N 21/4788* (2013.01)

(56) References Cited

U.S. PATENT DOCUMENTS

| | | |
|---|---|---|
| 5,534,911 A | 7/1996 | Levitan |
| 5,557,319 A | 9/1996 | Gurusami et al. |
| 5,628,284 A | 5/1997 | Sheen et al. |
| 5,708,961 A | 1/1998 | Hylton et al. |
| 5,745,837 A | 4/1998 | Fuhrmann |
| 5,758,257 A | 5/1998 | Herz et al. |
| 5,790,935 A | 8/1998 | Payton |
| 5,818,438 A | 10/1998 | Howe et al. |
| 5,822,530 A | 10/1998 | Brown |
| 5,838,921 A | 11/1998 | Speeter |
| 5,844,552 A | 12/1998 | Gaughan et al. |
| 5,897,635 A | 4/1999 | Torres et al. |
| 5,940,738 A | 8/1999 | Rao |
| 5,999,525 A | 12/1999 | Krishnaswamy et al. |
| 5,999,535 A | 12/1999 | Wang et al. |
| 6,118,472 A | 9/2000 | Dureau et al. |
| 6,125,397 A | 9/2000 | Yoshimura et al. |
| 6,167,432 A | 12/2000 | Jiang |
| 6,181,697 B1 | 1/2001 | Nurenberg et al. |
| 6,219,710 B1 | 4/2001 | Gray et al. |
| 6,233,389 B1 | 5/2001 | Barton et al. |
| 6,259,701 B1 | 7/2001 | Shur et al. |
| 6,286,049 B1 | 9/2001 | Rajakarunanayake et al. |
| 6,317,884 B1 | 11/2001 | Eames et al. |
| 6,345,038 B1 | 2/2002 | Selinger |
| 6,389,538 B1 | 5/2002 | Gruse et al. |
| 6,396,531 B1 | 5/2002 | Gerszberg et al. |
| 6,473,793 B1 | 10/2002 | Dillon et al. |
| 6,519,062 B1 | 2/2003 | Yoo |
| 6,523,696 B1 | 2/2003 | Saito et al. |
| 6,546,016 B1 | 4/2003 | Gerszberg et al. |
| 6,564,381 B1 | 5/2003 | Hodge et al. |
| 6,640,145 B2 | 10/2003 | Hoffberg et al. |
| 6,642,938 B1 | 11/2003 | Gilboy |
| 6,642,939 B1 | 11/2003 | Vallone et al. |
| 6,643,262 B1 | 11/2003 | Larsson et al. |
| 6,694,145 B2 | 2/2004 | Riikonen et al. |
| 6,711,742 B1 | 3/2004 | Kishi et al. |
| 6,718,552 B1 | 4/2004 | Goode |
| 6,721,789 B1 | 4/2004 | Demoney |
| 6,748,395 B1 | 6/2004 | Picker et al. |
| 6,754,904 B1 | 6/2004 | Cooper et al. |
| 6,757,906 B1 | 6/2004 | Look et al. |
| 6,774,926 B1 | 8/2004 | Ellis et al. |
| 6,788,676 B2 | 9/2004 | Partanen et al. |
| 6,847,778 B1 | 1/2005 | Vallone et al. |
| 6,865,746 B1 | 3/2005 | Herrington et al. |
| 6,909,726 B1 | 6/2005 | Sheeran |
| 6,918,131 B1 | 7/2005 | Rautila et al. |
| 6,925,257 B2 | 8/2005 | Yoo |
| 6,931,018 B1 | 8/2005 | Fisher |
| 6,934,964 B1 | 8/2005 | Schaffer et al. |
| 6,944,150 B1 | 9/2005 | McConnell et al. |
| 6,968,566 B1 * | 11/2005 | Entwistle ............... H04N 5/445 |
| 6,973,489 B1 | 12/2005 | Levy |
| 6,978,474 B1 | 12/2005 | Sheppard et al. |
| 6,981,045 B1 | 12/2005 | Brooks |
| 7,003,670 B2 | 2/2006 | Heaven et al. |
| 7,006,881 B1 | 2/2006 | Hoffberg et al. |
| 7,009,972 B2 | 3/2006 | Maher et al. |
| 7,013,290 B2 | 3/2006 | Ananian |
| 7,020,652 B2 | 3/2006 | Matz et al. |
| 7,027,460 B2 | 4/2006 | Iyer et al. |
| 7,039,048 B1 | 5/2006 | Monta et al. |
| 7,051,352 B1 | 5/2006 | Schaffer |
| 7,054,902 B2 | 5/2006 | Toporek et al. |
| 7,055,031 B2 | 5/2006 | Platt |
| 7,055,165 B2 | 5/2006 | Connelly |
| 7,068,639 B1 | 6/2006 | Varma et al. |
| 7,096,483 B2 | 8/2006 | Johnson |
| 7,099,308 B2 | 8/2006 | Merrill et al. |
| 7,100,183 B2 | 8/2006 | Kunkel et al. |
| 7,103,905 B2 | 9/2006 | Novak |
| 7,106,382 B2 | 9/2006 | Shiotsu |
| 7,143,168 B1 | 11/2006 | Dibiasio et al. |
| 7,146,627 B1 | 12/2006 | Ismail et al. |
| 7,149,772 B1 | 12/2006 | Kalavade |
| 7,167,895 B1 | 1/2007 | Connelly |
| 7,174,126 B2 | 2/2007 | McElhatten et al. |
| 7,174,127 B2 | 2/2007 | Otten et al. |
| 7,174,385 B2 | 2/2007 | Li |
| 7,185,355 B1 | 2/2007 | Ellis et al. |
| 7,206,775 B2 | 4/2007 | Kaiser et al. |
| 7,207,055 B1 | 4/2007 | Hendricks et al. |
| 7,209,458 B2 | 4/2007 | Ahvonen et al. |
| 7,213,036 B2 | 5/2007 | Apparao et al. |
| 7,228,556 B2 | 6/2007 | Beach et al. |
| 7,242,960 B2 | 7/2007 | Van Rooyen et al. |
| 7,242,988 B1 | 7/2007 | Hoffberg et al. |
| 7,254,608 B2 | 8/2007 | Yeager et al. |
| 7,257,106 B2 | 8/2007 | Chen et al. |
| 7,260,823 B2 | 8/2007 | Schlack et al. |
| 7,293,276 B2 | 11/2007 | Phillips et al. |
| 7,312,391 B2 | 12/2007 | Kaiser et al. |
| 7,325,043 B1 | 1/2008 | Rosenberg et al. |
| 7,325,073 B2 | 1/2008 | Shao et al. |
| 7,330,483 B1 | 2/2008 | Peters, Jr. et al. |
| 7,330,510 B2 | 2/2008 | Castillo et al. |
| 7,333,483 B2 | 2/2008 | Zhao et al. |
| 7,336,787 B2 | 2/2008 | Unger et al. |
| 7,337,458 B2 | 2/2008 | Michelitsch et al. |
| 7,340,759 B1 | 3/2008 | Rodriguez |
| 7,340,762 B2 | 3/2008 | Kim |
| 7,359,375 B2 | 4/2008 | Lipsanen et al. |
| 7,363,643 B2 | 4/2008 | Drake et al. |
| 7,376,386 B2 | 5/2008 | Phillips et al. |
| 7,382,786 B2 | 6/2008 | Chen et al. |
| 7,406,515 B1 | 7/2008 | Joyce et al. |
| 7,444,655 B2 | 10/2008 | Sardera |
| 7,457,520 B2 | 11/2008 | Rosetti et al. |
| 7,486,869 B2 | 2/2009 | Alexander et al. |
| 7,487,523 B1 | 2/2009 | Hendricks |
| 7,532,712 B2 | 5/2009 | Gonder et al. |
| 7,548,562 B2 | 6/2009 | Ward et al. |
| 7,567,983 B2 | 7/2009 | Pickelsimer et al. |
| 7,571,452 B2 | 8/2009 | Gutta |
| 7,592,912 B2 | 9/2009 | Hasek et al. |
| 7,602,820 B2 | 10/2009 | Helms et al. |
| 7,609,637 B2 | 10/2009 | Doshi et al. |
| 7,624,337 B2 | 11/2009 | Sull et al. |
| 7,650,319 B2 | 1/2010 | Hoffberg et al. |
| 7,690,020 B2 | 3/2010 | Lebar |
| 7,693,171 B2 | 4/2010 | Gould |
| 7,721,314 B2 | 5/2010 | Sincaglia et al. |
| 7,725,553 B2 | 5/2010 | Rang et al. |
| 7,742,074 B2 | 6/2010 | Minatogawa |

(56) References Cited

U.S. PATENT DOCUMENTS

| | | | |
|---|---|---|---|
| 7,763,360 B2 | 7/2010 | Paul et al. |
| 7,770,200 B2 | 8/2010 | Brooks et al. |
| 7,787,539 B2 | 8/2010 | Chen |
| 7,809,942 B2 | 10/2010 | Baran et al. |
| 7,870,245 B2 | 1/2011 | Butler |
| 7,889,765 B2 | 2/2011 | Brooks et al. |
| 7,893,171 B2 | 2/2011 | Le et al. |
| 7,900,052 B2 | 3/2011 | Jonas et al. |
| 7,908,626 B2 | 3/2011 | Williamson et al. |
| 7,916,755 B2 | 3/2011 | Hasek et al. |
| 7,924,451 B2 | 4/2011 | Hirooka |
| 7,936,775 B2 | 5/2011 | Iwamura |
| 7,937,725 B1 | 5/2011 | Schaffer et al. |
| 7,954,131 B2 | 5/2011 | Cholas et al. |
| 7,975,283 B2 | 7/2011 | Bedingfield, Sr. et al. |
| 7,987,491 B2 | 7/2011 | Reisman |
| 8,015,306 B2 | 9/2011 | Bowman |
| 8,032,914 B2 | 10/2011 | Rodriguez |
| 8,042,054 B2 | 10/2011 | White et al. |
| 8,046,836 B2 | 10/2011 | Isokawa |
| 8,056,103 B2 | 11/2011 | Candelore |
| 8,095,610 B2 | 1/2012 | Gould et al. |
| 8,151,194 B1 | 4/2012 | Chan et al. |
| 8,166,126 B2 | 4/2012 | Bristow et al. |
| 8,170,065 B2 | 5/2012 | Hasek et al. |
| 8,219,134 B2 | 7/2012 | Maharajh et al. |
| 8,249,497 B2 | 8/2012 | Ingrassia et al. |
| 8,281,352 B2 | 10/2012 | Brooks et al. |
| 8,341,242 B2 | 12/2012 | Dillon et al. |
| 8,347,341 B2 | 1/2013 | Markley et al. |
| 8,396,055 B2 | 3/2013 | Patel et al. |
| 8,429,702 B2 | 4/2013 | Yasrebi et al. |
| 8,434,113 B1* | 4/2013 | Taymor .................. G06F 3/00 |
| 8,484,511 B2 | 7/2013 | Engel et al. |
| 8,516,529 B2 | 8/2013 | Lajoie et al. |
| 8,520,850 B2 | 8/2013 | Helms et al. |
| 8,583,758 B2 | 11/2013 | Casey et al. |
| 8,677,431 B2 | 3/2014 | Smith |
| 8,713,623 B2 | 4/2014 | Brooks |
| 8,731,053 B2 | 5/2014 | Karegoudar |
| 8,738,607 B2 | 5/2014 | Dettinger et al. |
| 8,750,490 B2 | 6/2014 | Murtagh et al. |
| 8,750,909 B2 | 6/2014 | Fan et al. |
| 8,805,270 B2 | 8/2014 | Maharajh et al. |
| 8,949,919 B2 | 2/2015 | Cholas et al. |
| 8,995,815 B2 | 3/2015 | Maharajh et al. |
| 9,124,608 B2 | 9/2015 | Jin et al. |
| 9,124,650 B2 | 9/2015 | Maharajh et al. |
| 9,215,423 B2 | 12/2015 | Kimble et al. |
| 9,342,661 B2 | 5/2016 | Cholas et al. |
| 9,357,247 B2 | 5/2016 | Cronk et al. |
| 9,906,838 B2 | 2/2018 | Cronk et al. |
| 10,116,676 B2 | 10/2018 | Roosenraad et al. |
| 2001/0004768 A1 | 6/2001 | Hodge et al. |
| 2001/0043613 A1 | 11/2001 | Wibowo et al. |
| 2001/0050924 A1 | 12/2001 | Herrmann et al. |
| 2001/0050945 A1 | 12/2001 | Lindsey |
| 2002/0002688 A1 | 1/2002 | Gregg et al. |
| 2002/0024943 A1 | 2/2002 | Karaul et al. |
| 2002/0026645 A1 | 2/2002 | Son et al. |
| 2002/0027883 A1 | 3/2002 | Belaiche |
| 2002/0027894 A1 | 3/2002 | Arrakoski et al. |
| 2002/0031120 A1 | 3/2002 | Rakib |
| 2002/0032754 A1 | 3/2002 | Logston et al. |
| 2002/0042921 A1 | 4/2002 | Ellis |
| 2002/0049755 A1 | 4/2002 | Koike |
| 2002/0053076 A1 | 5/2002 | Landesmann |
| 2002/0056125 A1 | 5/2002 | Hodge et al. |
| 2002/0059218 A1 | 5/2002 | August et al. |
| 2002/0059619 A1 | 5/2002 | Lebar |
| 2002/0066033 A1 | 5/2002 | Dobbins et al. |
| 2002/0075805 A1 | 6/2002 | Gupta et al. |
| 2002/0083451 A1 | 6/2002 | Gill et al. |
| 2002/0087995 A1 | 7/2002 | Pedlow et al. |
| 2002/0095689 A1 | 7/2002 | Novak |
| 2002/0100059 A1 | 7/2002 | Buehl et al. |
| 2002/0104087 A1 | 8/2002 | Schaffer et al. |
| 2002/0123931 A1 | 9/2002 | Splaver et al. |
| 2002/0129368 A1 | 9/2002 | Schlack et al. |
| 2002/0131511 A1 | 9/2002 | Zenoni |
| 2002/0141347 A1 | 10/2002 | Harp et al. |
| 2002/0143607 A1 | 10/2002 | Connelly |
| 2002/0144267 A1 | 10/2002 | Gutta et al. |
| 2002/0147771 A1 | 10/2002 | Traversat et al. |
| 2002/0152091 A1 | 10/2002 | Nagaoka et al. |
| 2002/0152299 A1 | 10/2002 | Traversat et al. |
| 2002/0178444 A1 | 11/2002 | Trajkovic et al. |
| 2002/0188744 A1 | 12/2002 | Mani |
| 2002/0188869 A1 | 12/2002 | Patrick |
| 2002/0188947 A1 | 12/2002 | Wang et al. |
| 2002/0194595 A1 | 12/2002 | Miller et al. |
| 2003/0005453 A1 | 1/2003 | Rodriguez et al. |
| 2003/0012190 A1 | 1/2003 | Kaku et al. |
| 2003/0028451 A1 | 2/2003 | Ananian |
| 2003/0028873 A1 | 2/2003 | Lemmons |
| 2003/0046704 A1 | 3/2003 | Laksono et al. |
| 2003/0056217 A1 | 3/2003 | Brooks |
| 2003/0061618 A1 | 3/2003 | Horiuchi et al. |
| 2003/0093794 A1 | 5/2003 | Thomas et al. |
| 2003/0097574 A1 | 5/2003 | Upton |
| 2003/0115267 A1 | 6/2003 | Hinton et al. |
| 2003/0118014 A1 | 6/2003 | Iyer et al. |
| 2003/0135628 A1 | 7/2003 | Fletcher et al. |
| 2003/0135860 A1 | 7/2003 | Dureau |
| 2003/0163443 A1 | 8/2003 | Wang |
| 2003/0163832 A1* | 8/2003 | Tsuria .................. H04N 7/14 |
| 2003/0165241 A1 | 9/2003 | Fransdonk |
| 2003/0166401 A1 | 9/2003 | Combes et al. |
| 2003/0200548 A1 | 10/2003 | Baran et al. |
| 2003/0208767 A1 | 11/2003 | Williamson et al. |
| 2003/0217137 A1 | 11/2003 | Roese et al. |
| 2003/0217365 A1 | 11/2003 | Caputo |
| 2003/0220100 A1 | 11/2003 | McElhatten et al. |
| 2004/0003402 A1 | 1/2004 | McKenna, Jr. |
| 2004/0019913 A1 | 1/2004 | Wong et al. |
| 2004/0031058 A1 | 2/2004 | Reisman |
| 2004/0034677 A1 | 2/2004 | Davey et al. |
| 2004/0034877 A1 | 2/2004 | Nogues |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0049694 A1 | 3/2004 | Candelore |
| 2004/0057457 A1 | 3/2004 | Ahn et al. |
| 2004/0073915 A1 | 4/2004 | Dureau |
| 2004/0117254 A1 | 6/2004 | Nemirofsky et al. |
| 2004/0117838 A1 | 6/2004 | Karaoguz et al. |
| 2004/0133923 A1 | 7/2004 | Watson et al. |
| 2004/0137918 A1 | 7/2004 | Varonen et al. |
| 2004/0158870 A1 | 8/2004 | Paxton et al. |
| 2004/0166832 A1 | 8/2004 | Portman et al. |
| 2004/0174900 A1 | 9/2004 | Volpi et al. |
| 2004/0216158 A1 | 10/2004 | Blas |
| 2004/0230994 A1 | 11/2004 | Urdang et al. |
| 2004/0250273 A1 | 12/2004 | Swix et al. |
| 2004/0268403 A1 | 12/2004 | Krieger et al. |
| 2005/0002418 A1 | 1/2005 | Yang et al. |
| 2005/0034171 A1 | 2/2005 | Benya |
| 2005/0047501 A1 | 3/2005 | Yoshida et al. |
| 2005/0049886 A1 | 3/2005 | Grannan et al. |
| 2005/0055220 A1 | 3/2005 | Lee et al. |
| 2005/0055729 A1 | 3/2005 | Atad et al. |
| 2005/0071882 A1 | 3/2005 | Rodriguez et al. |
| 2005/0083921 A1 | 4/2005 | McDermott, III et al. |
| 2005/0086334 A1 | 4/2005 | Aaltonen et al. |
| 2005/0086683 A1 | 4/2005 | Meyerson |
| 2005/0102696 A1* | 5/2005 | Westberg ............... H04N 7/025 |
| 2005/0108763 A1 | 5/2005 | Baran et al. |
| 2005/0114701 A1 | 5/2005 | Atkins et al. |
| 2005/0114900 A1 | 5/2005 | Ladd et al. |
| 2005/0157731 A1 | 7/2005 | Peters |
| 2005/0165899 A1 | 7/2005 | Mazzola |
| 2005/0177855 A1 | 8/2005 | Maynard et al. |
| 2005/0188415 A1 | 8/2005 | Riley |
| 2005/0223097 A1 | 10/2005 | Ramsayer et al. |

(56) References Cited

U.S. PATENT DOCUMENTS

| | | |
|---|---|---|
| 2005/0228725 A1 | 10/2005 | Rao et al. |
| 2005/0262542 A1* | 11/2005 | DeWeese .............. H04N 7/173 |
| 2005/0289616 A1 | 12/2005 | Horiuchi et al. |
| 2005/0289618 A1 | 12/2005 | Hardin |
| 2006/0020786 A1 | 1/2006 | Helms et al. |
| 2006/0021004 A1 | 1/2006 | Moran et al. |
| 2006/0021019 A1 | 1/2006 | Hinton et al. |
| 2006/0041905 A1 | 2/2006 | Wasilewski |
| 2006/0041915 A1 | 2/2006 | Dimitrova et al. |
| 2006/0047957 A1 | 3/2006 | Helms et al. |
| 2006/0053463 A1 | 3/2006 | Choi |
| 2006/0059342 A1 | 3/2006 | Medvinsky et al. |
| 2006/0062209 A1* | 3/2006 | Riley .................... H04L 12/66 |
| 2006/0085416 A1 | 4/2006 | Naoi et al. |
| 2006/0088030 A1 | 4/2006 | Beeson et al. |
| 2006/0095940 A1 | 5/2006 | Yearwood |
| 2006/0117379 A1 | 6/2006 | Bennett et al. |
| 2006/0130099 A1 | 6/2006 | Rooyen |
| 2006/0130101 A1 | 6/2006 | Wessel Van Rooyen |
| 2006/0130107 A1 | 6/2006 | Gonder et al. |
| 2006/0130113 A1 | 6/2006 | Carlucci et al. |
| 2006/0136964 A1 | 6/2006 | Diez et al. |
| 2006/0136968 A1 | 6/2006 | Han et al. |
| 2006/0149850 A1 | 7/2006 | Bowman |
| 2006/0156392 A1 | 7/2006 | Baugher et al. |
| 2006/0161635 A1 | 7/2006 | Lamkin et al. |
| 2006/0165173 A1 | 7/2006 | Kim et al. |
| 2006/0171423 A1 | 8/2006 | Helms et al. |
| 2006/0187900 A1 | 8/2006 | Akbar |
| 2006/0206712 A1 | 9/2006 | Dillaway et al. |
| 2006/0209799 A1 | 9/2006 | Gallagher et al. |
| 2006/0218601 A1 | 9/2006 | Michel |
| 2006/0218604 A1 | 9/2006 | Riedl et al. |
| 2006/0221246 A1 | 10/2006 | Yoo |
| 2006/0224690 A1 | 10/2006 | Falkenburg et al. |
| 2006/0236358 A1 | 10/2006 | Liu et al. |
| 2006/0238656 A1 | 10/2006 | Chen et al. |
| 2006/0248553 A1 | 11/2006 | Mikkelson et al. |
| 2006/0259927 A1 | 11/2006 | Acharya et al. |
| 2006/0291506 A1 | 12/2006 | Cain |
| 2007/0019645 A1 | 1/2007 | Menon |
| 2007/0022459 A1 | 1/2007 | Gaebel, Jr. et al. |
| 2007/0022469 A1 | 1/2007 | Cooper et al. |
| 2007/0025271 A1 | 2/2007 | Niedrich et al. |
| 2007/0025372 A1 | 2/2007 | Brenes et al. |
| 2007/0033282 A1 | 2/2007 | Mao et al. |
| 2007/0033531 A1 | 2/2007 | Marsh |
| 2007/0049245 A1 | 3/2007 | Lipman |
| 2007/0050822 A1 | 3/2007 | Stevens et al. |
| 2007/0053513 A1 | 3/2007 | Hoffberg et al. |
| 2007/0061023 A1 | 3/2007 | Hoffberg et al. |
| 2007/0067851 A1 | 3/2007 | Fernando et al. |
| 2007/0073704 A1 | 3/2007 | Bowden et al. |
| 2007/0076728 A1 | 4/2007 | Rieger et al. |
| 2007/0081537 A1 | 4/2007 | Wheelock |
| 2007/0094691 A1 | 4/2007 | Gazdzinski |
| 2007/0100981 A1 | 5/2007 | Adamczyk et al. |
| 2007/0113246 A1 | 5/2007 | Xiong |
| 2007/0118848 A1 | 5/2007 | Schwesinger et al. |
| 2007/0121578 A1 | 5/2007 | Annadata et al. |
| 2007/0121678 A1 | 5/2007 | Brooks et al. |
| 2007/0124488 A1 | 5/2007 | Baum et al. |
| 2007/0124769 A1 | 5/2007 | Casey et al. |
| 2007/0124781 A1 | 5/2007 | Casey et al. |
| 2007/0127519 A1 | 6/2007 | Hasek et al. |
| 2007/0150920 A1 | 6/2007 | Lee et al. |
| 2007/0153775 A1 | 7/2007 | Renschler |
| 2007/0153820 A1 | 7/2007 | Gould |
| 2007/0154041 A1 | 7/2007 | Beauchamp |
| 2007/0157234 A1 | 7/2007 | Walker |
| 2007/0157262 A1 | 7/2007 | Ramaswamy et al. |
| 2007/0162945 A1 | 7/2007 | Mills |
| 2007/0180230 A1 | 8/2007 | Cortez |
| 2007/0204300 A1 | 8/2007 | Markley et al. |
| 2007/0204314 A1 | 8/2007 | Hasek et al. |
| 2007/0209054 A1 | 9/2007 | Cassanova |
| 2007/0209059 A1 | 9/2007 | Moore et al. |
| 2007/0217436 A1 | 9/2007 | Markley et al. |
| 2007/0219910 A1 | 9/2007 | Martinez |
| 2007/0226365 A1 | 9/2007 | Hildreth et al. |
| 2007/0245376 A1 | 10/2007 | Svendsen |
| 2007/0250880 A1 | 10/2007 | Hainline |
| 2007/0261116 A1 | 11/2007 | Prafullchandra et al. |
| 2007/0276925 A1 | 11/2007 | La Joie et al. |
| 2007/0276926 A1 | 11/2007 | Lajoie et al. |
| 2007/0280298 A1 | 12/2007 | Hearn et al. |
| 2007/0288637 A1 | 12/2007 | Layton et al. |
| 2007/0288715 A1 | 12/2007 | Boswell et al. |
| 2007/0294717 A1 | 12/2007 | Hill et al. |
| 2007/0294738 A1 | 12/2007 | Kuo et al. |
| 2007/0299728 A1 | 12/2007 | Nemirofsky et al. |
| 2008/0021836 A1 | 1/2008 | Lao |
| 2008/0022012 A1 | 1/2008 | Wang |
| 2008/0036917 A1 | 2/2008 | Pascarella et al. |
| 2008/0056128 A1 | 3/2008 | Joyce et al. |
| 2008/0059804 A1 | 3/2008 | Shah et al. |
| 2008/0066112 A1 | 3/2008 | Bailey et al. |
| 2008/0086750 A1 | 4/2008 | Yasrebi et al. |
| 2008/0091805 A1 | 4/2008 | Malaby et al. |
| 2008/0091807 A1 | 4/2008 | Strub et al. |
| 2008/0092163 A1 | 4/2008 | Song et al. |
| 2008/0092181 A1 | 4/2008 | Britt |
| 2008/0098212 A1 | 4/2008 | Helms et al. |
| 2008/0098450 A1 | 4/2008 | Wu et al. |
| 2008/0101460 A1 | 5/2008 | Rodriguez |
| 2008/0112405 A1 | 5/2008 | Cholas et al. |
| 2008/0127245 A1 | 5/2008 | Olds |
| 2008/0127255 A1 | 5/2008 | Ress et al. |
| 2008/0133551 A1 | 6/2008 | Wensley et al. |
| 2008/0134165 A1 | 6/2008 | Anderson et al. |
| 2008/0137541 A1 | 6/2008 | Agarwal et al. |
| 2008/0137740 A1 | 6/2008 | Thoreau et al. |
| 2008/0155059 A1 | 6/2008 | Hardin et al. |
| 2008/0162353 A1 | 7/2008 | Tom et al. |
| 2008/0170530 A1 | 7/2008 | Connors et al. |
| 2008/0170551 A1 | 7/2008 | Zaks |
| 2008/0177998 A1 | 7/2008 | Apsangi et al. |
| 2008/0178225 A1 | 7/2008 | Jost |
| 2008/0192820 A1 | 8/2008 | Brooks et al. |
| 2008/0198780 A1 | 8/2008 | Sato |
| 2008/0201386 A1 | 8/2008 | Maharajh et al. |
| 2008/0201748 A1 | 8/2008 | Hasek et al. |
| 2008/0222684 A1 | 9/2008 | Mukraj et al. |
| 2008/0229379 A1 | 9/2008 | Akhter |
| 2008/0234051 A1* | 9/2008 | McNutt .................... A63F 9/24 |
| 2008/0235746 A1 | 9/2008 | Peters et al. |
| 2008/0244667 A1 | 10/2008 | Osborne |
| 2008/0273591 A1 | 11/2008 | Brooks et al. |
| 2008/0279534 A1 | 11/2008 | Buttars |
| 2008/0281971 A1 | 11/2008 | Leppanen et al. |
| 2008/0282299 A1 | 11/2008 | Koat et al. |
| 2008/0297669 A1 | 12/2008 | Zalewski et al. |
| 2008/0306903 A1 | 12/2008 | Larson et al. |
| 2008/0307429 A1 | 12/2008 | Fontaine et al. |
| 2008/0320523 A1 | 12/2008 | Morris et al. |
| 2008/0320540 A1 | 12/2008 | Brooks et al. |
| 2009/0010271 A1 | 1/2009 | Bachmann et al. |
| 2009/0013356 A1 | 1/2009 | Doerr et al. |
| 2009/0025027 A1 | 1/2009 | Craner |
| 2009/0030802 A1 | 1/2009 | Plotnick et al. |
| 2009/0031335 A1 | 1/2009 | Hendricks et al. |
| 2009/0064221 A1 | 3/2009 | Stevens |
| 2009/0083279 A1 | 3/2009 | Hasek |
| 2009/0083811 A1 | 3/2009 | Dolce et al. |
| 2009/0083813 A1 | 3/2009 | Dolce et al. |
| 2009/0086643 A1 | 4/2009 | Kotrla et al. |
| 2009/0086722 A1 | 4/2009 | Kaji |
| 2009/0098861 A1 | 4/2009 | Kalliola et al. |
| 2009/0100459 A1 | 4/2009 | Riedl et al. |
| 2009/0100493 A1 | 4/2009 | Jones et al. |
| 2009/0111456 A1 | 4/2009 | Shaffer et al. |
| 2009/0133048 A1 | 5/2009 | Gibbs et al. |
| 2009/0141696 A1 | 6/2009 | Chou et al. |
| 2009/0144438 A1 | 6/2009 | Montpetit |

(56) References Cited

U.S. PATENT DOCUMENTS

| | | |
|---|---|---|
| 2009/0150210 A1 | 6/2009 | Athsani et al. |
| 2009/0150917 A1 | 6/2009 | Huffman et al. |
| 2009/0151006 A1 | 6/2009 | Saeki et al. |
| 2009/0158311 A1 | 6/2009 | Hon et al. |
| 2009/0172776 A1 | 7/2009 | Makagon et al. |
| 2009/0175218 A1 | 7/2009 | Song et al. |
| 2009/0185576 A1 | 7/2009 | Kisel et al. |
| 2009/0187939 A1 | 7/2009 | Lajoie |
| 2009/0187944 A1 | 7/2009 | White et al. |
| 2009/0193486 A1 | 7/2009 | Patel et al. |
| 2009/0196268 A1 | 8/2009 | Caldwell et al. |
| 2009/0201917 A1 | 8/2009 | Maes et al. |
| 2009/0210899 A1 | 8/2009 | Lawrence-Apfelbaum et al. |
| 2009/0210912 A1 | 8/2009 | Cholas et al. |
| 2009/0225760 A1 | 9/2009 | Foti |
| 2009/0235308 A1 | 9/2009 | Ehlers et al. |
| 2009/0271826 A1 | 10/2009 | Lee et al. |
| 2009/0282241 A1 | 11/2009 | Prafullchandra et al. |
| 2009/0282449 A1 | 11/2009 | Lee |
| 2009/0291631 A1 | 11/2009 | Xue et al. |
| 2009/0293101 A1 | 11/2009 | Carter et al. |
| 2009/0296621 A1 | 12/2009 | Park et al. |
| 2010/0012568 A1 | 1/2010 | Fujisawa et al. |
| 2010/0027560 A1 | 2/2010 | Yang et al. |
| 2010/0030578 A1 | 2/2010 | Siddique et al. |
| 2010/0031299 A1 | 2/2010 | Harrang et al. |
| 2010/0042478 A1 | 2/2010 | Reisman |
| 2010/0043030 A1 | 2/2010 | White |
| 2010/0083329 A1 | 4/2010 | Joyce et al. |
| 2010/0083362 A1 | 4/2010 | Francisco et al. |
| 2010/0086020 A1 | 4/2010 | Schlack |
| 2010/0106846 A1 | 4/2010 | Noldus et al. |
| 2010/0115091 A1 | 5/2010 | Park et al. |
| 2010/0115113 A1 | 5/2010 | Short et al. |
| 2010/0122274 A1 | 5/2010 | Gillies et al. |
| 2010/0122276 A1 | 5/2010 | Chen |
| 2010/0125658 A1 | 5/2010 | Strasters |
| 2010/0131973 A1 | 5/2010 | Dillon et al. |
| 2010/0135646 A1 | 6/2010 | Bang et al. |
| 2010/0138900 A1 | 6/2010 | Peterka et al. |
| 2010/0169977 A1 | 7/2010 | Dasher et al. |
| 2010/0199299 A1 | 8/2010 | Chang et al. |
| 2010/0199312 A1 | 8/2010 | Chang et al. |
| 2010/0202368 A1 | 8/2010 | Hans |
| 2010/0217613 A1 | 8/2010 | Kelly |
| 2010/0218231 A1 | 8/2010 | Frink et al. |
| 2010/0219613 A1 | 9/2010 | Zaloom et al. |
| 2010/0242063 A1* | 9/2010 | Slaney ............... H04N 7/10 |
| 2010/0251304 A1 | 9/2010 | Donoghue et al. |
| 2010/0251305 A1 | 9/2010 | Kimble et al. |
| 2010/0269144 A1 | 10/2010 | Forsman et al. |
| 2010/0280641 A1 | 11/2010 | Harkness et al. |
| 2010/0287609 A1 | 11/2010 | Gonzalez et al. |
| 2010/0313225 A1 | 12/2010 | Cholas et al. |
| 2010/0325547 A1 | 12/2010 | Keng et al. |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0035072 A1 | 2/2011 | Jackson |
| 2011/0071841 A1 | 3/2011 | Fomenko et al. |
| 2011/0078001 A1 | 3/2011 | Archer et al. |
| 2011/0078005 A1 | 3/2011 | Klappert |
| 2011/0078731 A1 | 3/2011 | Nishimura |
| 2011/0090898 A1 | 4/2011 | Patel et al. |
| 2011/0093900 A1 | 4/2011 | Patel et al. |
| 2011/0099017 A1 | 4/2011 | Ure |
| 2011/0102600 A1 | 5/2011 | Todd |
| 2011/0103374 A1 | 5/2011 | Lajoie et al. |
| 2011/0107379 A1 | 5/2011 | Lajoie et al. |
| 2011/0107389 A1 | 5/2011 | Chakarapani |
| 2011/0110515 A1 | 5/2011 | Tidwell et al. |
| 2011/0113146 A1 | 5/2011 | Li et al. |
| 2011/0126018 A1 | 5/2011 | Narsinh et al. |
| 2011/0126244 A1 | 5/2011 | Hasek |
| 2011/0138064 A1 | 6/2011 | Rieger et al. |
| 2011/0145049 A1 | 6/2011 | Hertel et al. |
| 2011/0161409 A1 | 6/2011 | Nair et al. |
| 2011/0166932 A1 | 7/2011 | Smith et al. |
| 2011/0173053 A1 | 7/2011 | Aaltonen et al. |
| 2011/0173095 A1 | 7/2011 | Kassaei et al. |
| 2011/0178943 A1 | 7/2011 | Motahari et al. |
| 2011/0191801 A1 | 8/2011 | Vytheeswaran |
| 2011/0213688 A1 | 9/2011 | Santos et al. |
| 2011/0219229 A1 | 9/2011 | Cholas et al. |
| 2011/0219411 A1 | 9/2011 | Smith |
| 2011/0239253 A1 | 9/2011 | West et al. |
| 2011/0264530 A1 | 10/2011 | Santangelo et al. |
| 2011/0265116 A1 | 10/2011 | Stern et al. |
| 2011/0276881 A1 | 11/2011 | Keng et al. |
| 2011/0277008 A1 | 11/2011 | Smith |
| 2012/0005527 A1 | 1/2012 | Engel et al. |
| 2012/0011567 A1 | 1/2012 | Cronk et al. |
| 2012/0023535 A1 | 1/2012 | Brooks |
| 2012/0030363 A1 | 2/2012 | Conrad |
| 2012/0124606 A1 | 5/2012 | Tidwell et al. |
| 2012/0144416 A1 | 6/2012 | Wetzer et al. |
| 2012/0185899 A1 | 7/2012 | Riedl et al. |
| 2013/0013364 A1* | 1/2013 | Beers ............... G06Q 10/00 |
| 2013/0014140 A1 | 1/2013 | Ye et al. |
| 2013/0014171 A1 | 1/2013 | Sansom et al. |
| 2013/0024888 A1 | 1/2013 | Sivertsen |
| 2013/0024891 A1 | 1/2013 | Elend et al. |
| 2013/0046849 A1 | 2/2013 | Wolf et al. |
| 2013/0091025 A1* | 4/2013 | Farahat ............... G06Q 30/02 |
| 2013/0091214 A1* | 4/2013 | Kellerman ............... G06F 15/16 |
| 2013/0097647 A1 | 4/2013 | Brooks et al. |
| 2013/0117692 A1 | 5/2013 | Padmanabhan et al. |
| 2013/0139193 A1 | 5/2013 | Fan et al. |
| 2013/0174187 A1* | 7/2013 | Tan ............... H04N 21/462 |
| 2013/0311464 A1 | 11/2013 | Nix et al. |
| 2014/0074855 A1 | 3/2014 | Zhao et al. |
| 2014/0201799 A1 | 7/2014 | Smith |
| 2015/0020126 A1 | 1/2015 | Kegel et al. |
| 2015/0040176 A1 | 2/2015 | Hybertson et al. |
| 2015/0095932 A1 | 4/2015 | Ren |

FOREIGN PATENT DOCUMENTS

| | | |
|---|---|---|
| JP | 2001275090 A | 10/2001 |
| JP | 2005519365 A | 6/2005 |
| JP | 2005519501 A | 6/2005 |
| JP | 2005339093 A | 12/2005 |
| JP | 2008015936 A | 1/2008 |
| JP | 2009211632 A | 9/2009 |
| JP | 2010502109 A | 1/2010 |
| JP | 2010079902 A | 4/2010 |
| JP | 2012505436 A | 3/2012 |
| JP | 2012523614 A | 10/2012 |
| WO | WO-0110125 A1 | 2/2001 |
| WO | WO-0139505 A2 | 5/2001 |
| WO | WO-2005015422 A1 | 2/2005 |
| WO | WO-2005031524 A2 | 4/2005 |
| WO | WO-2007060451 A2 | 5/2007 |
| WO | WO-2012021245 A1 | 2/2012 |
| WO | WO-2012114140 A1 | 8/2012 |

OTHER PUBLICATIONS

Cantor, et al., Bindings for the OASIS Security Assertion Markup Language (SAML) V2.0, OASIS Standard, Mar. 2005, Document ID saml-bindings-2.0-os ,(http://docs.oasis-open.org/security/saml/v2.0/saml-bindings-2.0-os.pdf).

DLNA (Digital Living Network Alliance) protocols described in DLNA Networked Device Interoperability Guidelines Expanded, Mar. 2006 and subsequent expanded version dated Oct. 2006.

DOCSIS 3.0 Management Features Differences Technical Report CM-TR-MGMTv3 0-DIFF-V01-071228, pp. 1-62.

DOCSIS 3.0 OSSI Configuration Management Technical Report CM-TR-OSSIv3 0-CM-V01-080936 pp. 1-84.

Florin L., et al., "Content Delivery and Management in Networked MPEG-4 System," 2000 10th European Signal Processing Confer-

(56) References Cited

OTHER PUBLICATIONS ence, IEEE, Sep. 4, 2000 (Sep. 4, 2000), pp. 1-4, XP032755920, ISBN: 978-952-15-0443-3 [retrieved on Mar. 31, 2015].
MPEG Headers Quick Reference, http://dvd.sourceforge.net/dvdinfo/mpeghdrs.html, Mar. 6, 2006.
OpenCable, Enhanced TV Binary Interchange, Format 1.0 OC-SP-ETV-BIF1.0-I04-070921 Date: Sep. 21, 2007, 420 pages.
OpenCable Specifications, Tuning Resolver Interface Specification, OS-SP-TRIF-I01-080130, Jan. 30, 2008, pp. 1-50.
Pantjiaros C.A. P., et al., "Broadband Service Delivery: CY.T.A. ADSL Field Trial Experience", Electrotechnical Conference, 2000 MELECON, 2000 10th Mediterranean, May 29-31, 2000, Piscataway, NJ, USA,IEEE, vol. 1, May 29, 2000 (May 29, 2000), pp. 221-224, XP010518859, ISBN: 978-0-7803-6290-1.
Redux screenshot from http://www.redux.com, "Select a channel to start watching" © 2014 Redux, Inc.014 Redux, Inc. All rights reserved; http://www.redux.com/; 2 pages.
Siebenlist F., et al., "Global Grid Forum Specification Roadmap towards a Secure OGSA," Jul. 2002, pp. 1-22.
UTF-32, IBM, retrieved from http://publib.boulder.ibm.com/infocenter/iseries/v5r3/index.jsp?topic=%2Fnls%2Frbagsutf32.htm on Aug. 28, 2013.

* cited by examiner

APPARATUS AND METHODS FOR PROVIDING ENHANCED OR INTERACTIVE FEATURES

PRIORITY AND RELATED APPLICATIONS

This application is a divisional of and claims priority to co-owned and co-pending U.S. patent application Ser. No. 13/619,951 of the same title filed Sep. 14, 2012, which is incorporated herein by reference in its entirety.

Additionally, the present application is related to co-owned and co-pending U.S. Pat. No. 7,954,131 issued on May 31, 2011 and entitled "PREMISES GATEWAY APPARATUS AND METHODS FOR USE IN A CONTENT-BASED NETWORK", U.S. patent application Ser. No. 12/764,746 filed on Apr. 21, 2010 and entitled "METHODS AND APPARATUS FOR PACKETIZED CONTENT DELIVERY OVER A CONTENT DELIVERY NETWORK", U.S. Patent Application Publication No. 2011/0090898 filed on Oct. 20, 2009 and entitled "METHODS AND APPARATUS FOR ENABLING MEDIA FUNCTIONALITY IN A CONTENT-BASED NETWORK", U.S. patent application Ser. No. 12/414,554 filed on Mar. 30, 2009 and entitled "PERSONAL MEDIA CHANNEL APPARATUS AND METHODS" and U.S. patent application Ser. No. 12/414,576 filed on Mar. 30, 2009 and entitled "RECOMMENDATION ENGINE APPARATUS AND METHODS", each of which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of Invention

The present invention relates generally to the field of content and/or data delivery over a network. More particularly, the present invention is related in one exemplary aspect to apparatus and methods for utilization of a network (such as e.g., a managed content delivery network) for providing enhanced or interactive features.

2. Description of Related Technology

The proliferation of the Internet and increased connection technologies such as broadband have contributed to the development of a new media source for information and entertainment. Accordingly, new and interesting opportunities for providing television viewers with advanced features, applications and services arise.

So-called "interactive TV" or "iTV" includes techniques for allowing viewers to interact with television content. In an iTV paradigm, various levels of interactivity may be provided. For example, low interactivity comprises current technologies for changing channels, increasing or reducing volume, and turning on or off the television content. Moderate interactivity may include services such as on-demand, pay-per-view, etc. where a user may search and select to view particular content, as well as so called "trick-mode" functionality (rewind, fast forward, pause, etc.). High interactivity may include, for example, providing an audience the ability to affect or interact with the television content. One exemplary embodiment of such high interactivity iTV includes real-time on-screen voting, in which audience votes create decisions that are reflected in how the program continues.

Enhanced TV (ETV) is one example of iTV. ETV is used primarily with respect to two-screen solutions (i.e., TV and PC services). In one embodiment, users of ETV services have a television and computer in the same room, and use the service to navigate their web browser to a particular program-specific website that is synchronized to the live program by the broadcast television network. In an alternative approach, the user's computer may have a television tuner card, or a television network or managed network (multiple systems operator (MSO)) may offer a web browser. However, such two-screen solutions may only provide supplemental information, and/or may not enable a user to affect live programming (i.e., may not offer high interactivity). Further, the ETV two screen solutions do not present a user with one single unified interface for interaction with content.

Hence, what is needed is a user-friendly mechanism for viewing television content and simultaneously interacting with one or more media features or applications, including interactive television applications. Such methods and apparatus would advantageously leverage premises bandwidth as well as be available to mobile devices. Additionally, exemplary methods and apparatus would be further useful in providing direct user interaction, participatory user interaction, group interaction, and anonymous interaction with programming and/or advertising content.

SUMMARY OF THE INVENTION

The present invention addresses the foregoing needs by disclosing, inter alia, apparatus and methods for utilization of a network for providing enhanced or interactive features.

In a first aspect of the invention, a method of enabling user interaction with content is disclosed. In one embodiment, the content is delivered over a managed content delivery network, and the method includes: providing a first user access to first content via the managed content delivery network; providing access to one or more applications which enable the first user to generate second content, the second content comprising a manipulation of one or more aspects of the first content; and enabling the user to make the second content accessible to one or more second users.

In a second aspect of the invention, a method of enabling a plurality of users to actively participate with content delivered over a content delivery network is disclosed. In one embodiment, the method includes: notifying the plurality of users of an event, the event being enabled for participation and relating to particular content; scheduling a date and time for delivery of the particular content associated with the event; delivering the particular content associated with the event to the plurality of users; and enabling the plurality of users to interactively participate in the event. In one variant, the interaction comprises at least one of interaction of individual ones of the plurality of users independent of other ones of the plurality, or interaction of individual ones of the plurality of users simultaneously with one another.

In a third aspect of the invention, a method for interaction of a plurality of subscribers to a content delivery network with a content element delivered over the network is disclosed. In one embodiment, the method includes: determining a threshold number of subscribers required for participation in an event, the event being associated with the content element; notifying the plurality of subscribers of the event associated with the content element; enabling individual ones of the plurality of subscribers to designate an interest in participation in the event; and when a number of interested ones of the plurality of subscribers meets the threshold number, causing the event to occur for only the interested ones of the plurality of subscribers.

In a fourth aspect of the invention, a network server configured to provide a plurality of enhanced interactive features to a plurality of subscribers in a network is disclosed. In one embodiment, the server comprises: a storage entity; at least one network interface; and a digital processor in data communication with the storage entity and the at least one interface, the processor configured to run at least one computer program thereon. In one variant, the computer program comprise a plurality of instructions which are configured to, when executed: perform one or more decision-making tasks associated with the enhanced interactive features relating to particular content; randomize at least a portion of data stored at the storage entity; enable the plurality of subscribers to modify the particular content; generate one or more reports relating to interactivity of the plurality of subscribers with the particular content; and enable publication of at least one of the modified particular content and the one or more reports relating to interactivity.

In a fifth aspect of the invention, a mobile user device is disclosed. In one embodiment, the device includes at least one wireless interface for communication with a wireless LAN or MAN, and further includes a client application configured to communicate with a managed network-side server to provide the aforementioned interactive features to a plurality of users.

In a sixth aspect of the invention, a computer readable apparatus is disclosed. In one embodiment, the apparatus includes at least one computer program with a plurality of instructions which are configured to, when executed, provide high-bandwidth interactive services to a plurality of managed network users.

In a seventh aspect of the invention, methods and apparatus for participatory user interaction are disclosed. In one variant, the methods and apparatus provide participatory cooking channel functionality. In another variant, a participatory exercise/workout channel is provided. In another variant, live chat and video is provided. In yet a further variant, participatory educational TV is provided. In still another variant, television "roulette"/dating is provided.

In an eighth aspect of the invention, methods and apparatus for participatory group interaction are disclosed. In one variant, the methods and apparatus provide a rotating advertisement functionality. In another variant, participation advertisements are provided. In yet another variant, group content discounts are provided. In a further variant, group gaming is provided.

In a ninth aspect of the invention, methods and apparatus for anonymous user interaction are disclosed.

These and other aspects of the invention shall become apparent when considered in light of the disclosure provided herein.

Figure 1:
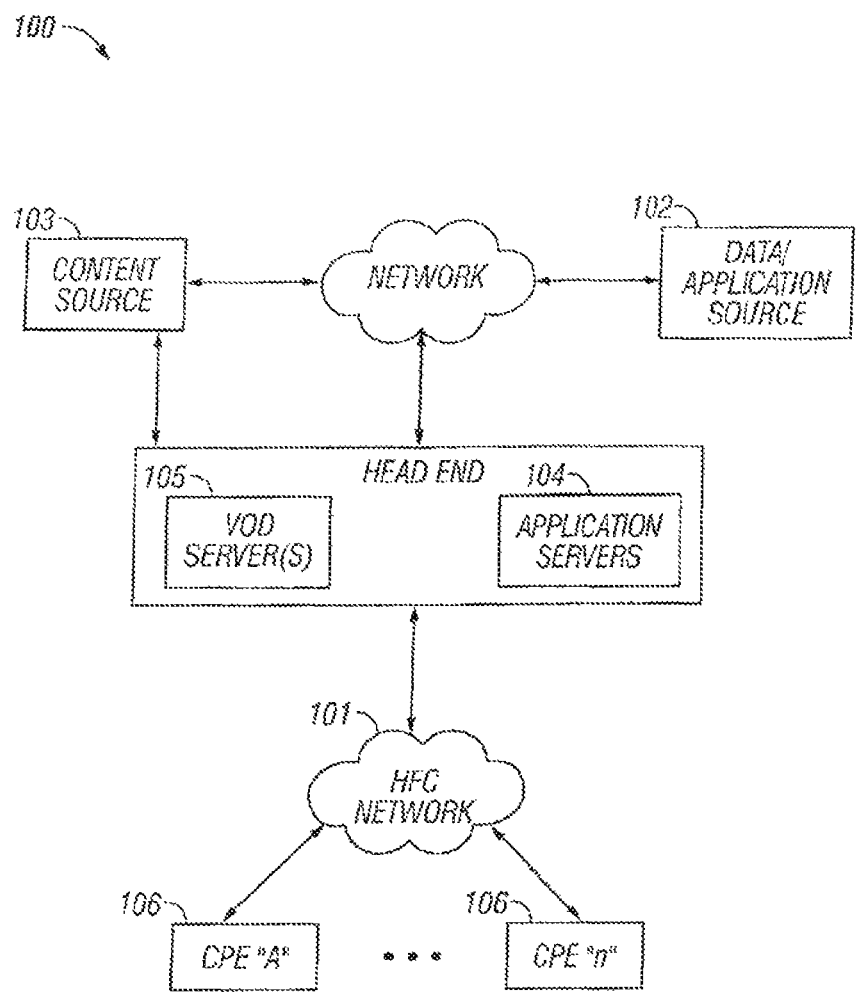
FIG. 1 is a functional block diagram illustrating an exemplary hybrid fiber network configuration useful with the present invention.

All Figures © Copyright 2012 Time Warner Cable, Inc. All rights reserved.

DETAILED DESCRIPTION OF THE INVENTION

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein, the terms "client device" and "end user device" include, but are not limited to, set top boxes (e.g., DSTBs), personal computers (PCs), and minicomputers, whether desktop, laptop, or otherwise, and mobile devices such as handheld computers, PDAs, personal media devices (PMDs), and smartphones.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

The term "Customer Premises Equipment (CPE)" refers to any type of electronic equipment located within a customer's or user's premises and connected to a network, such as set-top boxes (e.g., DSTBs or IP TV devices), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVR" (digital video recorder) refers generally to any type of recording mechanism and/or software environment, located in the headend, the user premises or anywhere else, whereby content sent over a network can be recorded and selectively recalled. Such DVR may be dedicated in nature, or part of a non-dedicated or multi-function system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network.

As used herein, the terms "Internet" and "internet" are used interchangeably to refer to inter-networks including, without limitation, the Internet.

As used herein, the term "memory" or "storage" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, LTE/LTE-A, WAP, SIP, UDP, FTP, RTP/RTCP, H.323, etc.).

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), Wi-Fi (802.11a,b,g,n), Wi-MAX (802.16), PAN (802.15), cellular (e.g., LTE/LTE-A, 3GPP, 3GPP2, UMTS), or IrDA families.

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.11 a/b/g/n.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, and infrared (i.e., IrDA).

Overview

In one salient aspect, the present invention comprises apparatus and methods for utilizing a network (such as an extant managed content delivery network) for providing enhanced social or interactive features, and media enhancement. These features are in many cases enabled by recently realized increases in available bandwidth, processing capacity, and/or IP-based delivery mechanisms that have become pervasive in both managed networks (such as cable, satellite, and other such broadband subscriber-based systems, and cellular/wireless networks such as 4G LTE networks), and non-managed networks (such as the Internet, WLANs, etc.).

In one embodiment, the exemplary apparatus and methods are implemented so as to enable a user to create a playlist of content (e.g., movies/linear broadcasts, clips, advertisements, promotions, etc.) from multiple different sources and of multiple different types. The content may be provided from e.g., currently broadcast content, previously stored content, user-generated content, web or other network content, etc. Additionally, mechanisms may be established for sharing such user-created playlists with friends or other network users/subscribers, such as via publication thereof.

In one variant, a user can upload user-generated or other content to the network, such as for insertion into a playlist at higher rates of speed using for instance a network operator-provided WMAN (e.g., WiMAX) dongle or other similar high-bandwidth apparatus.

In a further variant, one or more user-selected content elements may be modified with user commentary, and uploaded to the network to e.g., be shared with friends, family or other parties (which may or may not be other network subscribers).

In another embodiment, the enhanced or interactive features include participatory functionality. For example, users may participate individually, or with friends or other subscribers, in live or recorded content-based group activities (such as e.g., cooking, exercising, group viewing, dating, and learning/teaching).

The enhanced or interactive features of the invention further include in one variant music-based features for enabling a subscriber-specific, sharable music channel. In one implementation, the music channel may be linked to a general music storage entity, or alternatively specifically linked to the user's pre-existing stored music. The dedicated and personalized music channel is then made available over the high bandwidth content delivery network (such as e.g., a cable or satellite network, cellular/wireless networks, etc.) Other network content may be linked to the music provided via the music channel, such as for example music videos, web content including lyrics, band or artist information, etc.

In further embodiments, enhanced and/or interactive advertising and gaming are provided. For example, rotating group buy-in advertisements may be provided using the enhanced methods and architecture discussed herein. Additionally, a product registry (i.e., centralized location for enabling subscribers to identify one or more products/services which they are interested in as identified from commercials, product placement within primary content, etc.) may be enabled using the present invention. Group participation gaming (such as scavenger hunts and trivia games) is also enabled via various embodiments of the herein described methods and apparatus.

Still further, the present apparatus and methods may be used to provide general public use wireless access from existing private user devices.

DETAILED DESCRIPTION OF EXEMPLARY EMBODIMENTS

Exemplary embodiments of the apparatus and methods of the present invention are now described in detail. While these exemplary embodiments are described in the context of a managed hybrid fiber coax (HFC) cable system architecture having a multiple systems operator, digital networking capability, and plurality of client devices/CPE, the general principles and advantages of the invention may be extended to other types of networks and architectures, whether broadband, narrowband, wired or wireless, terrestrial or satellite, managed or unmanaged (or combinations thereof), or otherwise, the following therefore being merely exemplary in nature.

It will also be appreciated that while described generally in the context of a consumer (i.e., home) end user domain, the present invention may be readily adapted to other types of environments (e.g., commercial/enterprise, government/military, etc.) as well. Myriad other applications are possible.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

Bearer Network—

FIG. 1 illustrates a typical content delivery network configuration with which the apparatus and methods of the present invention may be used. The various components of the network 100 include (i) one or more data and application origination points 102; (ii) one or more content sources 103; (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the headend architecture of FIG. 1a (described in greater detail below) may be used.

The data/application origination point 102 comprises any medium that allows data and/or applications (such as a VOD-based or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill. The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104.

Figure 1A:
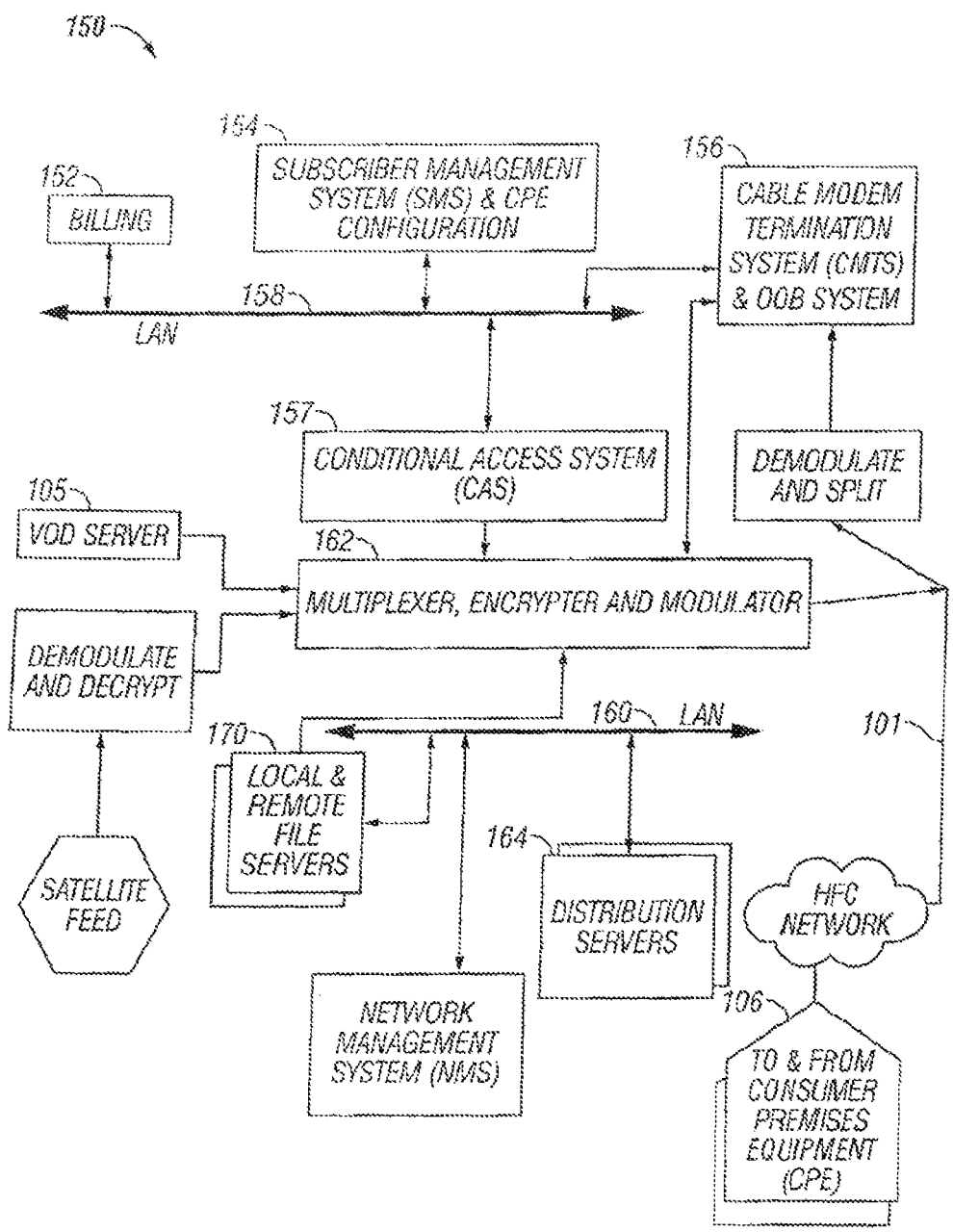
FIG. 1a is a functional block diagram illustrating one exemplary network headend configuration useful with the present invention.

Referring now to FIG. 1a, one exemplary embodiment of a headend architecture useful with the present invention is described. As shown in FIG. 1a, the headend architecture 150 comprises typical headend components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 1a is high-level, conceptual architecture and that each MSO may have multiple headends deployed using custom architectures.

Figure 1B:
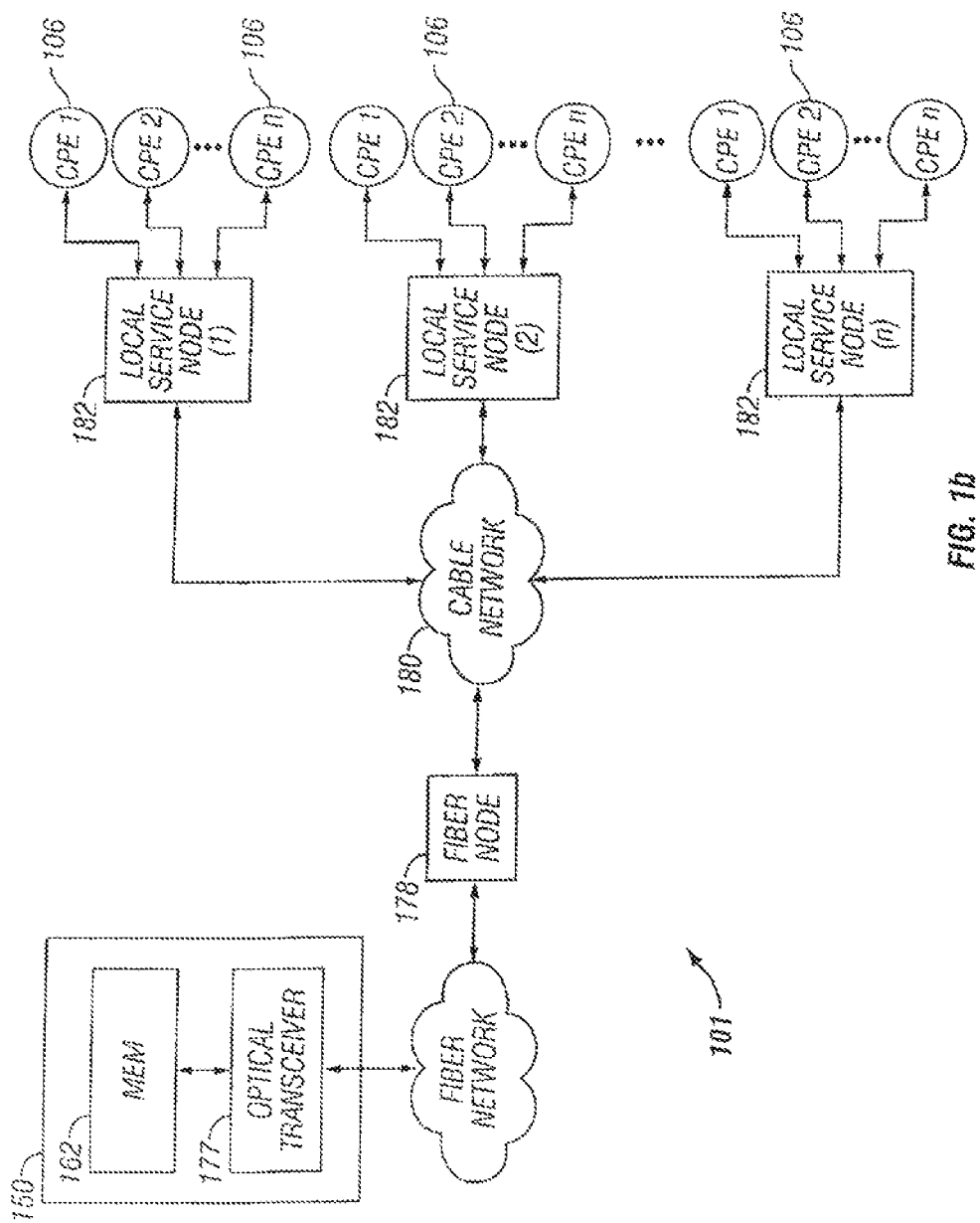
FIG. 1b is a functional block diagram illustrating one exemplary local service node configuration useful with the present invention.

The exemplary architecture 150 of FIG. 1a further includes a multiplexer-encrypter-modulator (MEM) 162 coupled to the HFC network 101 adapted to process or condition content for transmission over the network. The distribution servers 164 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 150 to the CPE 106 ("downstream") are multiplexed together in the headend, as previously described and sent to neighborhood hubs (FIG. 1*b*) via a variety of interposed network components.

Figure 1C:
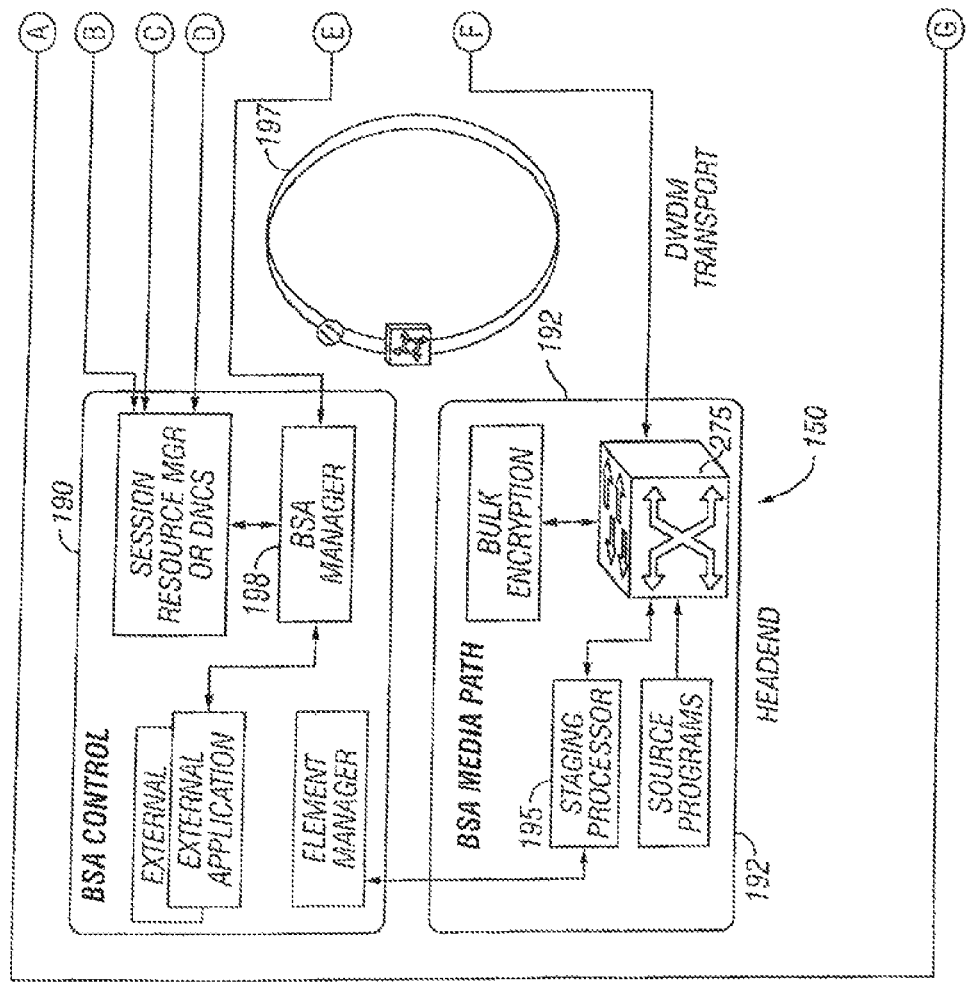
FIG. 1c is a functional block diagram illustrating one exemplary broadcast switched architecture (BSA) network useful with the present invention.
Figure 1C:
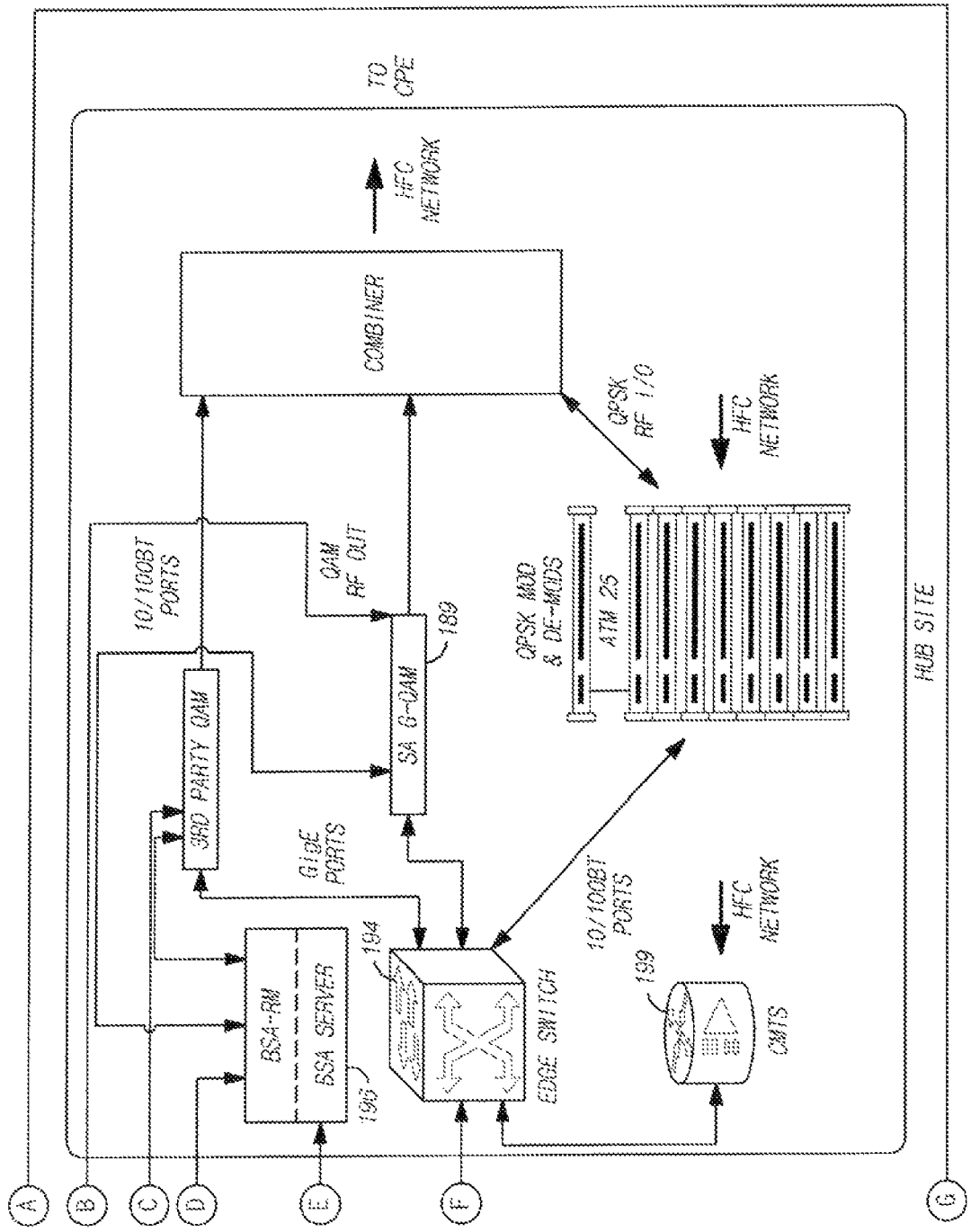

It will also be recognized, however, that the multiplexing operation(s) need not necessarily occur at the headend 150 (e.g., in the aforementioned MEM 162). For example, in one variant, at least a portion of the multiplexing is conducted at a BSA switching node or hub (see discussion of FIG. 1*c* provided subsequently herein). As yet another alternative, a multi-location or multi-stage approach can be used, such as that described in U.S. Pat. No. 7,602,820, entitled "APPARATUS AND METHODS FOR MULTI-STAGE MULTIPLEXING IN A NETWORK" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed forward" mechanisms for transferring information between multiplexing stages.

Content (e.g., audio, video, data, files, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

"Switched" Networks—

FIG. 1*c* illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber is unaware of any difference between programs delivered using a switched network and ordinary streaming broadcast delivery.

FIG. 1*c* shows the implementation details of one exemplary embodiment of this broadcast switched network architecture. Specifically, the headend 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the headend). An optical transport ring 197 is utilized to distribute the dense wave-division multiplexed (DWDM) optical signals to each hub in an efficient fashion.

Co-owned U.S. Patent Application Publication No. 2003/0056217 filed Sep. 20, 2001, entitled "TECHNIQUE FOR EFFECTIVELY PROVIDING PROGRAM MATERIAL IN A CABLE TELEVISION SYSTEM", and issued as U.S. Pat. No. 8,713,623 on Apr. 29, 2014, incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1*a* and 1*c* (and 1*d* discussed below) also deliver Internet data services using the Internet protocol (IP), although other protocols and transport mechanisms of the type well known in the digital communication art may be substituted. One exemplary delivery paradigm comprises delivering MPEG-based video content, with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem. Delivery in such packetized modes may be unicast, multicast, or broadcast.

Referring again to FIG. 1*c*, the IP packets associated with Internet services are received by edge switch 194, and in one embodiment forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPE. The IP packets are typically transmitted on RF channels (e.g., DOCSIS QAMs) that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

"Packetized" Networks—

Figure 1D:
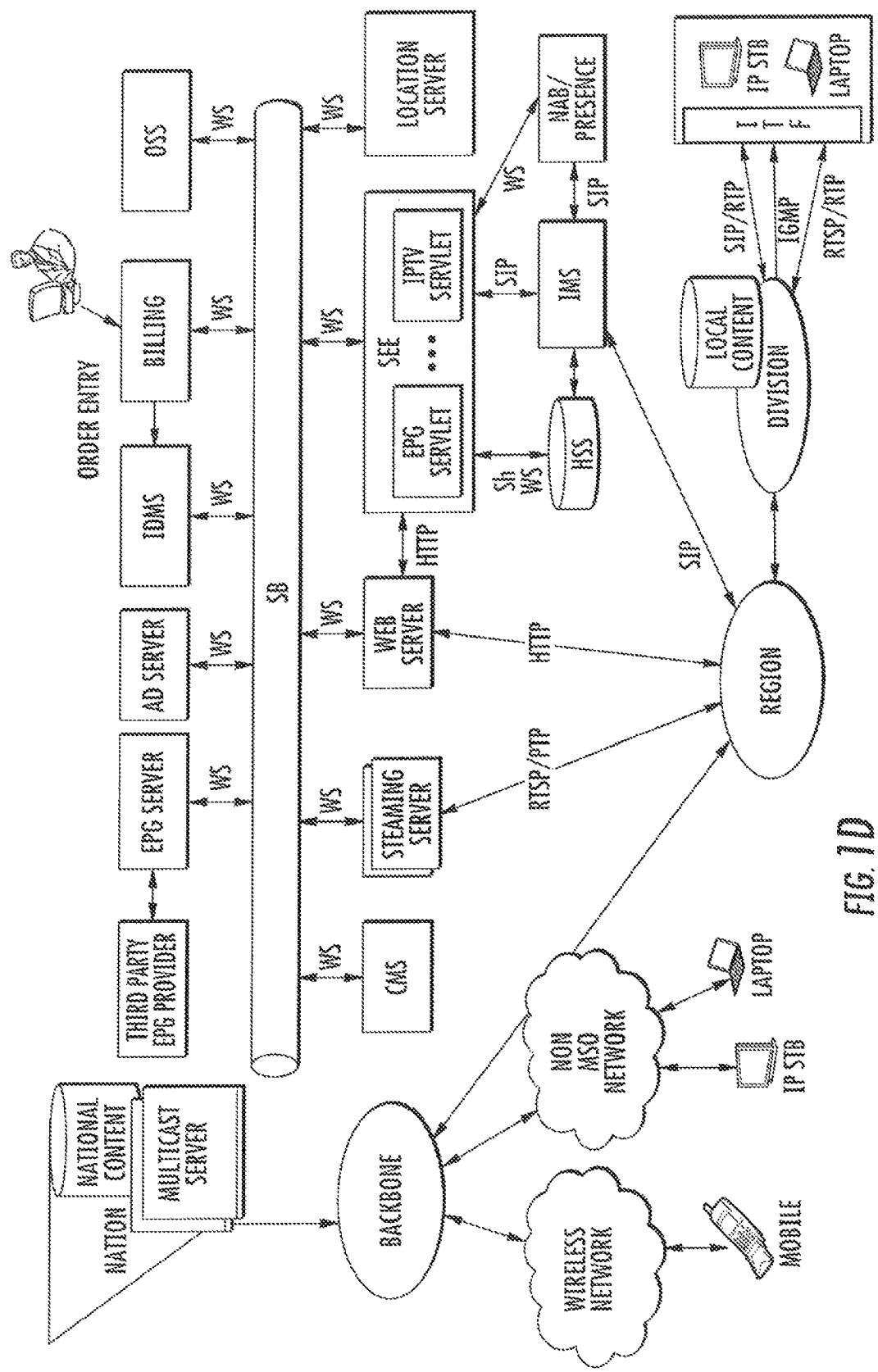
FIG. 1d is a functional block diagram illustrating one exemplary packetized content delivery network architecture useful with the present invention.

While the foregoing network architectures described herein can (and in fact do) carry packetized content (e.g., IP over MPEG for high-speed data or Internet TV, MPEG2 packet content over QAM for MPTS, etc.), they are often not optimized for such delivery. Hence, in accordance with another embodiment of the present invention, a "packet optimized" delivery network is used for carriage of the packet content (e.g., IPTV content). FIG. 1*d* illustrates one exemplary implementation of such a network, in the context of a 3GPP IMS (IP Multimedia Subsystem) network with common control plane and service delivery platform (SDP), as described in co-pending U.S. Provisional Patent Application Ser. No. 61/256,903 filed Oct. 30, 2009 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title filed on Apr. 21, 2010, and issued as U.S. Pat. No. 10,264,029 on Apr. 16, 2019, each of which is incorporated herein by reference in its entirety. Such a network provides, inter alia, significant enhancements in terms of common control of different services, implementation and management of content delivery sessions according to unicast or multicast models, etc.; however, it is appreciated that the various features of the present invention are in no way limited to this or any of the other foregoing architectures.

Media Enhancement Network Architecture—

Figure 2:
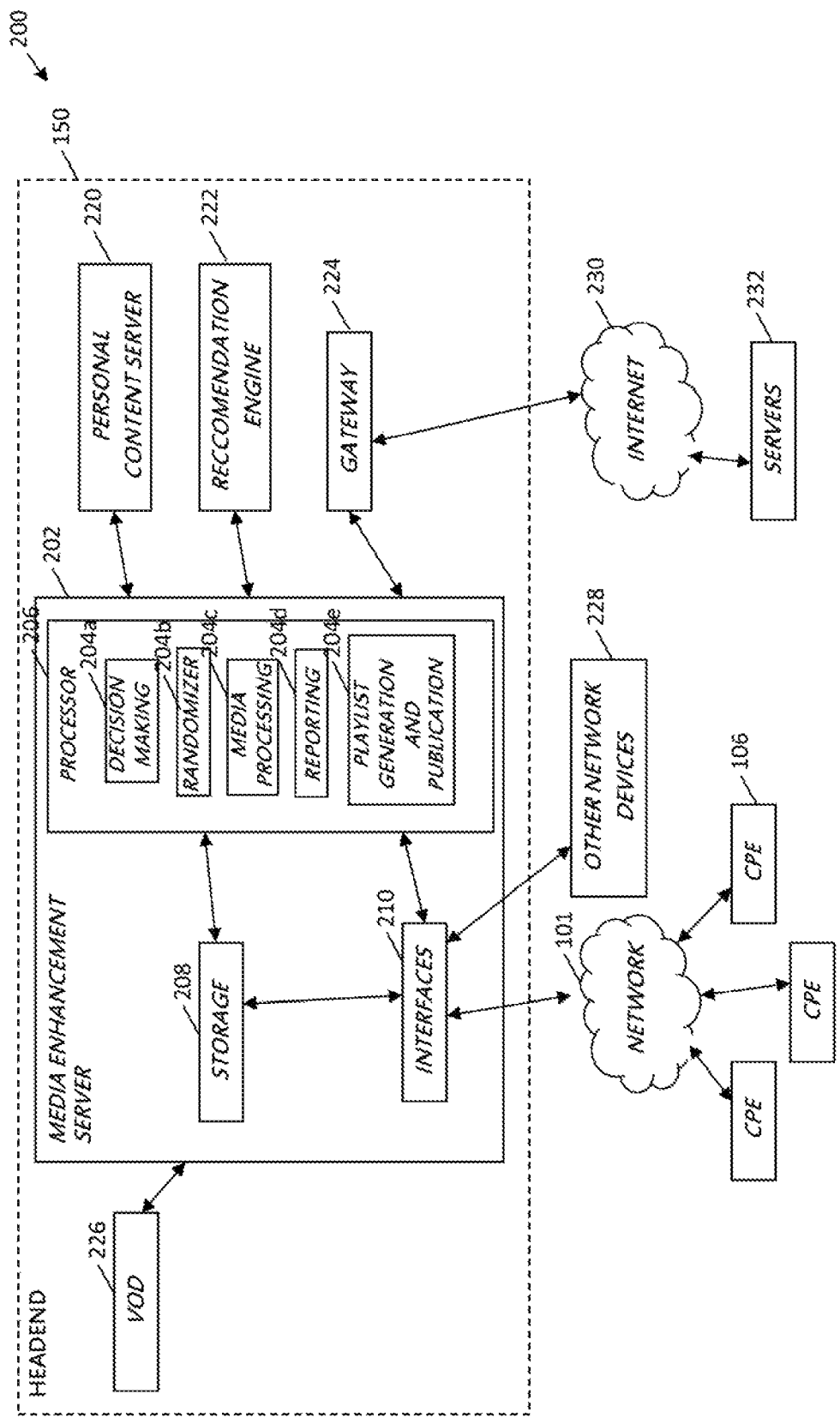
FIG. 2 is a functional block diagram illustrating an exemplary embodiment of a network architecture according to the present invention.

FIG. 2 is a block diagram illustrating a content delivery network architecture 200 for enabling media enhancement, social media, and interactivity options configured in accordance with one embodiment of the invention. The exemplary illustrated network entities and apparatus are configured to operate within the above-described networks of FIGS. 1-1d.

As shown, the network architecture 200 generally comprises a media enhancement server 202 in communication with a plurality of user devices 106 via a network 101. The media enhancement server 202 generally comprises a storage entity 214 for storing data relating to content, users, and/or system operations, a plurality of interfaces 216 for communication to other headend 150 entities and with the network 101, and one or more enhancement applications 204a-204e (collectively referred to as "enhancement applications 204") configured to run on a digital processor thereof 206.

As shown, the media enhancement server 202 generally comprises a network interface 210 for interfacing with the entities of the content delivery network 101, a processor 206, a storage apparatus 208, and a plurality of interfaces (not shown) for direct or indirect communication with e.g., the CPE 106, or other headend 150 entities. The other entities with which the media enhancement server 202 are in communication with include e.g., a VOD server 226 (for providing VOD content), a personal content server 220 (for providing headend storage of content associated to individual subscribers; see e.g., the personal content server discussed in U.S. patent application Ser. No. 11/440,490 filed on May 24, 2006, entitled "PERSONAL CONTENT SERVER APPARATUS AND METHODS", and issued as U.S. Pat. No. 8,280,982 on Oct. 2, 2012, which is incorporated herein by reference in its entirety), a recommendation engine 222 (for providing content recommendations; see e.g., the recommendation engine discussed in U.S. patent application Ser. No. 12/414,576 filed on Mar. 20, 2009, entitled "RECOMMENDATION ENGINE APPARATUS AND METHODS", and issued as U.S. Pat. No. 9,215,423 on Dec. 15, 2015, which is incorporated herein by reference in its entirety), and a gateway 224 (for communication to a non-managed network such as the Internet 230 and servers 232 thereof, or other types of managed or unmanaged networks such as for example 4G-enabled cellular networks managed by other service providers; see e.g., the gateway discussed in U.S. Pat. No. 7,954,131 issued on May 31, 2011 and entitled "PREMISES GATEWAY APPARATUS AND METHODS FOR USE IN A CONTENT-BASED NETWORK", which is incorporated herein by reference in its entirety). Communication between the media enhancement server 202 and these entities will be discussed below with respect to the various functions provided by the server 202 and data retrieved from each of the foregoing network entities.

In the illustrated embodiment, the server 202 is configured to run various enhancement applications 204 on the processor 206 thereof, including e.g., at least a decision making application 204a, a randomizer 204b, a media processing application 204c, a reporting application 204d, and/or a playlist generation and publication application 204e; however it is appreciated that additional or alternative applications may be utilized consistent with the enhancements and interactive features discussed herein, the foregoing being merely illustrative of the general concepts of the invention. Additionally, although illustrated as individual applications 204 running on the server 206, it is appreciated that the foregoing functionalities may comprise an individual application, or alternatively one or more distributed applications running on a plurality of entities in data communication with one another (including one or more network entities); e.g., the network may be configured with a first server for a first application/function, a different server for a second application/function, and so forth.

The media enhancement server 202 utilizes one or more of the enhancement applications 204 to provide enhanced and/or interactive services to its subscribers as discussed below. It will be further recognized that implementation of the features of the enhancement applications 204 may utilize communication to other network devices (such as e.g., the personal content server 220, recommendation engine 222, gateway 224, VOD server 226, etc.). Hence, the network architecture of FIG. 2 generally provides the functionalities discussed below.

It will be appreciated that the various applications 204 may also be configured to position data further toward the edge of the network (including even at the user's CPE or mobile device) so as to facilitate the various functions thereof. For example, information regarding a user's contacts/friends, activities, playlists, etc. may be disposed on the user CPE 106, including their mobile device (e.g., smartphone or tablet). This approach provides at least two benefits, including: (i) pushing further processing necessary to support the applications out to the edge of the network (or even onto the user device), so as to minimize core network bandwidth/resource consumption; and (ii) in the case of mobile devices, useful data pertaining to a given user is available regardless of where/how the user associates with the host network; e.g., at a Wi-Fi hotspot that is not associated with the user's premises, for example. Once the user has associated with the hotspot, they can log into the managed network (e.g., cable or satellite network) as a subscriber or user, and accordingly obtain access to the services provided by the network infrastructure while in effect being "away from home".

The enhancement applications 204 may be of the type discussed in co-owned, co-pending U.S. Patent Application Publication No. 2011/0090898 filed on Oct. 20, 2009, entitled "METHODS AND APPARATUS FOR ENABLING MEDIA FUNCTIONALITY IN A CONTENT-BASED NETWORK", and issued as U.S. Pat. No. 8,396,055 on Mar. 12, 2013, which is incorporated herein by reference in its entirety. As discussed in greater detail below, the enhancement applications 204 provide direct user interaction, participatory user interaction, group interaction, and anonymous interaction functions to subscribers.

In the embodiment of FIG. 2, the decision-making application 204a is configured to perform one or more tasks necessary for determining a plurality of contacts to present to a particular subscriber. In various ones of the applications discussed below, a subscriber is able to select one or more of his "friends" or contacts to e.g., share content, play games, share offers, etc. The decision-making application 204a uses information obtained from other linked applications (such as social media sites) as well as billing and network information to determine which other subscribers may be presented to the user as contacts. The decision-making application 204a then presents the list of potential contacts to the subscriber for approval in one embodiment. For example, a subscriber may be prompted to sign-in to a social media site or email account where contact information is stored. Once the system is granted access to the subscriber's account(s), the decision-making application 204a queries a server associated with the social media site or email server account to request information regarding the subscriber's contacts. If necessary, the information may then be cross-referenced by the decision-making application 204a to information stored in billing records (such as to determine one or more of the subscriber's contacts or friends that are also subscribers to the MSO). Alternatively, the list of contacts may be accessed and used despite a shared subscription to the MSO.

The decision-making application 204a may also be utilized to determine whether a particular answer submitted by a subscriber participating in a game (discussed in greater detail below) is correct/incorrect, such as via comparing a received response from a user to a stored value. Threshold numbers for entering games, coupons or offers, etc. may also be determined by the decision-making application 204a. Still further, the decision-making application 204a may be utilized for matching subscribers based on e.g., geographic and demographic considerations (e.g., within a given physical or virtual (e.g., psychographic) proximity of one another), or based on a dating algorithm for estimating compatibility by taking into account user-entered information (such as answers to personality questions), as well as what is known about a subscriber from the network.

The randomizer 204b is configured to provide randomization of users/subscribers, programming content, questions or item lists for games, etc. The application 204b calls upon stored information for selection therefrom to create a random viewing, chatting, and/or gaming experience. The stored information may be generated by the decision-making application 204a, and/or stored at the storage entity 208 of the media enhancement server 202 (or yet another storage entity in data communication with the system 200).

The media processing application 204c is utilized to carryout media processing instructions designated by a subscriber. The application 204c is configured, for example, to read flags marked within particular content by a subscriber, and cut a segment of content according to the flags. In one embodiment, cues, such as those described in American National Standards Institute (ANSI)/Society of Cable Telecommunications Engineers (SCTE)-35 2007 document entitled "DIGITAL PROGRAM INSERTION CUEING MESSAGE FOR CABLE", which is incorporated herein by reference in its entirety, may be utilized to identify or flag start and stop points for content segments. However, other mechanisms for enabling users to insert flags or identifiers may be utilized with equal success. Additionally, the processing application 204c may be configured to receive metadata describing content and one or more start and stop points therein, and use this information to locate the content and segment the content according to the start and stop points. The processing application 204c further enables user-created content to be used as overlays to currently broadcast or played content, as well as user-created programming (created by piecing together segments of one or more content elements). In further embodiments, the processing application 204c may be utilized to enable the user to append, amend and/or alter the display of content.

The exemplary embodiment of the reporting application 204d running on the processor 206 of the enhancement server 202 is utilized to generate statistics regarding program and/or advertisement viewing, gaming winners, gaming updates, and offer or coupon participation updates. The results are reported to e.g., all subscribers, only particular (participating) subscribers, and/or other network entities.

Lastly, the playlist generation and publication application 204e enables a user to create and publish playlists of content, advertisements, goods/services of interest, music, etc. Additionally, the publication application 204e provides subscribers with an ability to publish content clips, text, etc. to other social media sites, to other users, etc. Still further, the publication application 204e provides publication of gaming or couponing statuses.

Those of ordinary skill in the related arts will recognize that one significant limitation of existing HFC content distribution networks is the asymmetric nature of the bandwidth capabilities. Specifically, existing networks provide significantly higher download data rates than upload data rates. This limitation is not a problem for existing centralized content delivery schemes that are configured to broadcast and/or multicast content to a large population of subscribers. However, existing networks cannot easily facilitate ad hoc networking connections from a single user to many users; in fact, existing solutions for providing multicasting capabilities are handled generally within a proxy service (e.g., a 3rd party service provided via the Internet, etc.).

Existing DOCSIS Operation—

As a brief aside, a brief examination of prior art DOCSIS operation may be helpful in later comparisons with various aspects of the present invention. Existing DOCSIS operation is provided with the aforementioned Cable Modem Termination System (CMTS) which is connected to the broader Internet. The CMTS includes a number of servers which run the Dynamic Host Configuration Protocol (DHCP) protocol, a Trivial File Transfer Protocol (TFTP), and a Time of Day (TOD) server. The CMTS communicates with each subscriber's cable modem via the HFC network (which includes miles of coaxial cable, fiber optics, amplifiers, etc.). The CMTS provides a synchronization broadcast ("sync"), Uplink Channel Descriptor (UCD), and Media Access Protocol (MAP) messages. Both the UCD and sync broadcasts are periodically transmitted.

To establish a physical connection, a cable modem searches for and identifies the sync broadcast to determine its time alignment, decodes the current UCD to determine, inter alia, an appropriate uplink frequency, symbol rate, modulation profile, etc. Once a cable modem has achieved time synchronization and decoded the uplink parameters, it performs a ranging process by transmitting range requests (RANGE_REQ). If the CMTS responds to a RANGE_REQ with a range response (RANGE_RSP), then the cable modem and CMTS can transition to a station maintenance state and perform additional detailed connection maintenance. If the CMTS does not provide a RANGE_RSP, the cable modem will increase its transmit power and attempt access again.

Once an active connection is available, the cable modem can perform IP layer initialization procedures. The population of cable modems time share the uplink frequency(ies) according to a TDMA (time division multiple access) scheme, thus before transmitting, each cable modem must request an allocation of transmit bandwidth from the CMTS by transmitting a bandwidth request (REQUEST). The CMTS prioritizes requests within an internal queue, and allocates resources with the aforementioned MAP message which includes, inter alia, an allocated transmit time slot for the cable modem. After the cable modem has been allocated a transmit time slot, it attempts to locate a DHCP server which can provide an IP address and other network information (e.g., gateway addresses, network addresses, etc.) which are required for registration. Specifically, the cable modem will request and receive a time of day message from the TOD server, and a configuration file from the TFTP server.

After the IP layer initialization procedure, the cable modem must register with the CMTS. The registration process ensures that the cable modem has the proper configuration file and timing to operate with the existing network. Registration additionally ensures that the cable modem has not been compromised (e.g., "hacked"). If the registration process is successful, the cable modem is provided with a Service Identifier (SID), and is transitioned into an "online" state.

During online operation, the cable modem and CMTS perform medium access control (MAC) based on the SID. The IP layer operates transparently over the SID based MAC communication. For example, when a cable modem has data for transmission, it transmits a REQUEST to the CMTS. As previously alluded to, the CMTS prioritizes each REQUEST and allocates a number of time slots for each SID (each SID corresponds to a cable mode). These allocations are broadcast via MAP messages, which identify an applicable SID, the assigned time slot(s), and the number of bytes. Additionally, the CMTS periodically provides an Interval Usage Code (IUC) within the UCD which identifies a series of so called "burst-profiles". Each burst profile identifies an appropriate modulation scheme (e.g., QPSK, 16-QAM, 64-QAM, etc.) for a type of traffic. For example, IP traffic can be set to 64-QAM which provides high data rates, whereas VOIP traffic can be set to 16-QAM which provides more robust but lower data rates.

Exemplary Media Enhancement Layer Operation—

Within the context of existing DOCSIS operations, cable modems implement IP protocol access over the existing MAC capabilities of the HFC network, which presents several limitations. Firstly, the existing Quality of Service (QoS) capabilities of the HFC network (which are provided within the MAP messaging) are only loosely coupled to the of the overarching IP layer requirements; specifically, the QoS guarantees that are established between the cable modem IP layer and the CMTS are ultimately controlled by the CMTS; thus, the CMTS may in some cases allocate network resources in a manner that is less than optimal for a subscriber's application. The resulting effect may degrade performance, or alternately may cause the cable modem to conservatively request network resources (which unnecessarily consume network bandwidth).

Secondly, network access between cable modem devices is currently limited to IP layer access. Existing cable network installations were originally designed to support centralized content delivery infrastructures; in contrast, IP applications have been designed around ad hoc networking paradigms. Thus, existing DOCSIS deployments centralize IP access at the CMTS; thus, even linking two cable modems requires CMTS supervision. This can contribute to significant network bottlenecks, single-point-of-failure problems, etc. Additionally, IP layer applications are not linked to other forms of content. For example, in order to provide overlaid content (e.g., text, audio and video) with network programming (e.g., television shows, etc.), the overlaid content and the network programming content has to be combined externally (at a centralized network entity or via $3^{rd}$ party Internet based servers), or provided separately to be combined at the cable modem (which may require explicit time synchronization).

In contrast, in one embodiment of the present invention, the media enhancement server 202 provides a series of enhanced media application types. Each enhanced media application type may include e.g., MAC information enabling the CMTS to select appropriate MAC layer configurations (e.g., QoS configurations, etc.), IP information enabling direct routing of media data to an appropriate HFC network entity (e.g., a DHCP server, a Video on Demand (VOD) server, Broadcast Switch Architecture (BSA) server, etc.), and presentation information enabling the combination of the user supplied content with e.g., network programming content, other user content, etc.

Figure 2A:
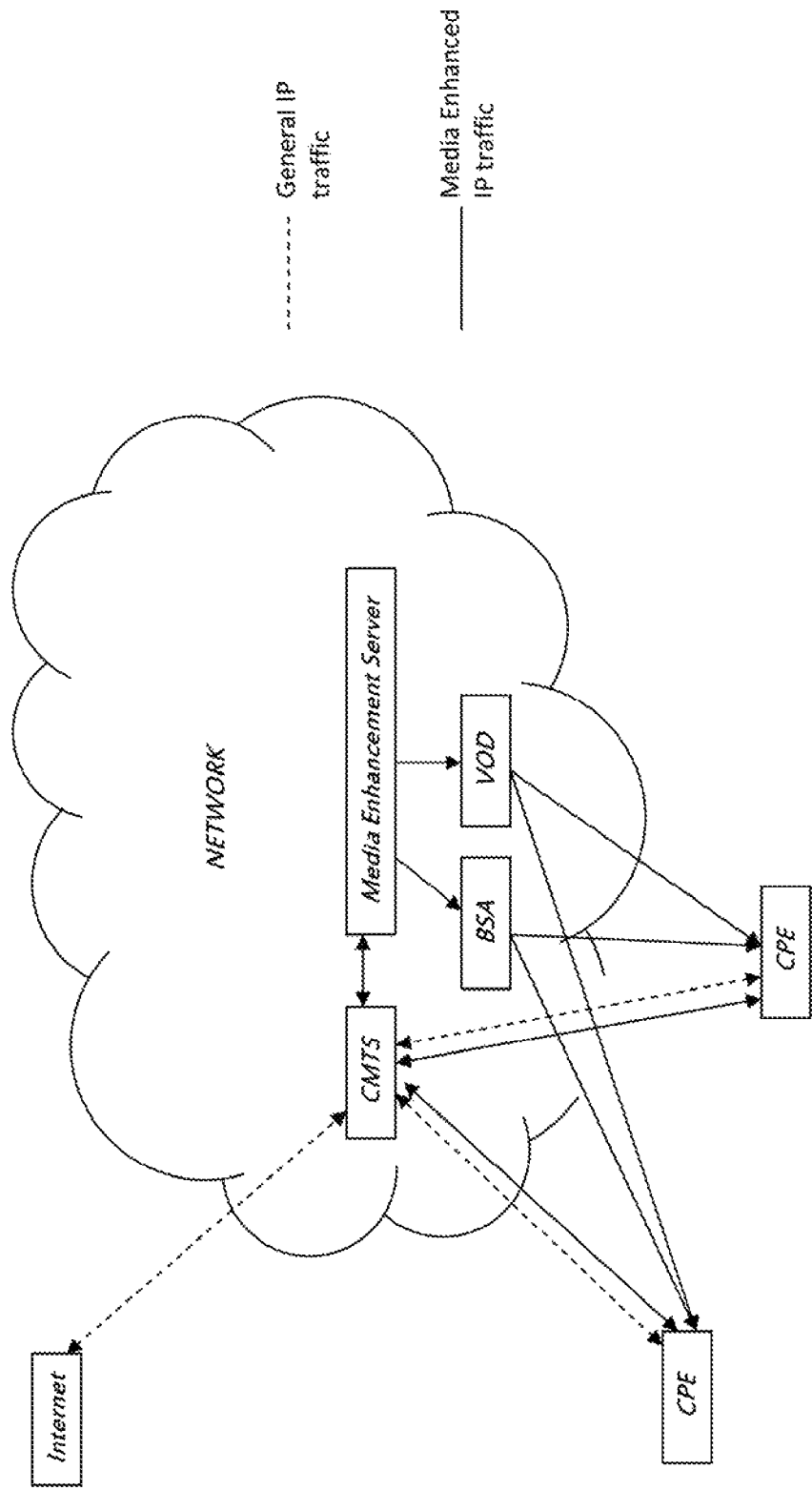
FIG. 2a is a functional block diagram illustrating a second exemplary embodiment of a network architecture according to the present invention.

Referring now to FIG. 2a, one logical representation of user content distribution is illustrated. As shown, a population of CPEs is illustrated in connection with a HFC network that includes a media enhancement server, a CMTS, a BSA server, a VOD server, and a DHCP server. During enhanced media operation, the subscriber's cable modem and the media enhancement server negotiate the appropriate enhanced media application type. The enhanced media application type specifies the MAC layer operation between the CPE and the CMTS. For example, the MAC information may include e.g., various QoS guarantees, number of reserved time slots, minimum data rate, maximum acceptable latency, modulation type, retransmission parameters, etc. For example, the CPE will provide generic IP data via traditional DOCSIS time slot negotiation, however enhanced media is transported via negotiated time slots. In this manner, the CMTS can quickly separate generic IP information for transport to the Internet backbone, and route the user generated media content to the media enhancement server. The overall processing burden for the CMTS is greatly reduced since routing for the pre-negotiated enhanced media application type can be handled by the media enhancement server.

Similarly, the enhanced media application type also determines the IP layer routing from the media enhancement server to e.g., the BSA server, the VOD server, the DHCP server, and/or the routing of other associated content. For instance, where user generated content is to be combined with other programming (e.g., one or more other channels), the routing information may specify the source of the programming content to be combined. In some variants, the routing information may be an IP address of the HFC network entity, however it is further appreciated that routing information may require significant amounts of network address translation (for security reasons, the CPE generally would not have access to the address of a BSA server, etc.).

Finally, the enhanced media application type determines the presentation of the user content in combination with e.g., other user content and/or existing network programming. Generally, the presentation information dictates how the user content is to be presented to e.g., another subscriber or set of subscribers, or advertisement engines, etc. In one variant the media enhancement server combines user generated data with other programming for presentation to another entity (such as another subscriber's CPE). In other variants, the media enhancement server combines the user generated data with other user generated data to further improve targeted programming (e.g., improving targeted advertisements). Is still other variants, the media enhancement server directly provides the user generated data to other users.

Consider for example, a user generated content channel. A user requests (or schedules ahead of time) an enhanced media user-content channel. The CMTS grants the cable modem and the media enhancement server 202 an appropriate fixed time slot allocation to support an audio, and video stream based on the enhanced media application type MAC information. Thereafter, the media enhancement server routes the enhanced media user-content channel according to the enhanced media application type routing information via a BSA server for delivery to other subscribers. Finally, the BSA server provides the user-content channel to any subscribers according to the presentation information.

In another example, a user generated content overlay is provided (e.g., text to be overlaid on programming). A user requests (or schedules ahead of time) an enhanced media user-content overlay. The CMTS grants the cable modem and the media enhancement server 202 an appropriate best effort delivery time slot allocation to support a text stream based on the enhanced media application type MAC information. Thereafter, the media enhancement server routes the enhanced media user-content overlay text to the corresponding network programming source. The network programming source formats the user generated overlay for delivery with the normal network programming. For user generated content overlay that require real time interaction, best effort delivery may be inadequate; thus some variants may specify real time delivery requirements, etc.

In still a third example, a user response is provided (e.g., input to be used for determining future programming). A user requests (or schedules ahead of time) an enhanced media user-response. The CMTS grants the cable modem and the media enhancement server 202 an appropriate best effort delivery time slot allocation to support a binary data stream based on the enhanced media application type MAC information. Thereafter, the media enhancement server provides the enhanced media user-response data to the corresponding network programming entity via the enhanced media application type routing information. Finally, during network programming the presentation information can be used to improve e.g., targeted advertisements.

Accordingly, benefits of the present invention include: (i) significant reuse of existing DOCSIS IP protocol access with current HFC network infrastructures, (ii) improved coordination between IP applications, and HFC MAC layer capabilities, and (iii) less complex schemes for combining user content with network content. The methods of FIGS. 3-5 herein indicate various exemplary processes which may be performed by the media enhancement applications 204 of the server 202, and are discussed in greater detail below.

Additional Network Architecture Embodiments—

Figure 2B:
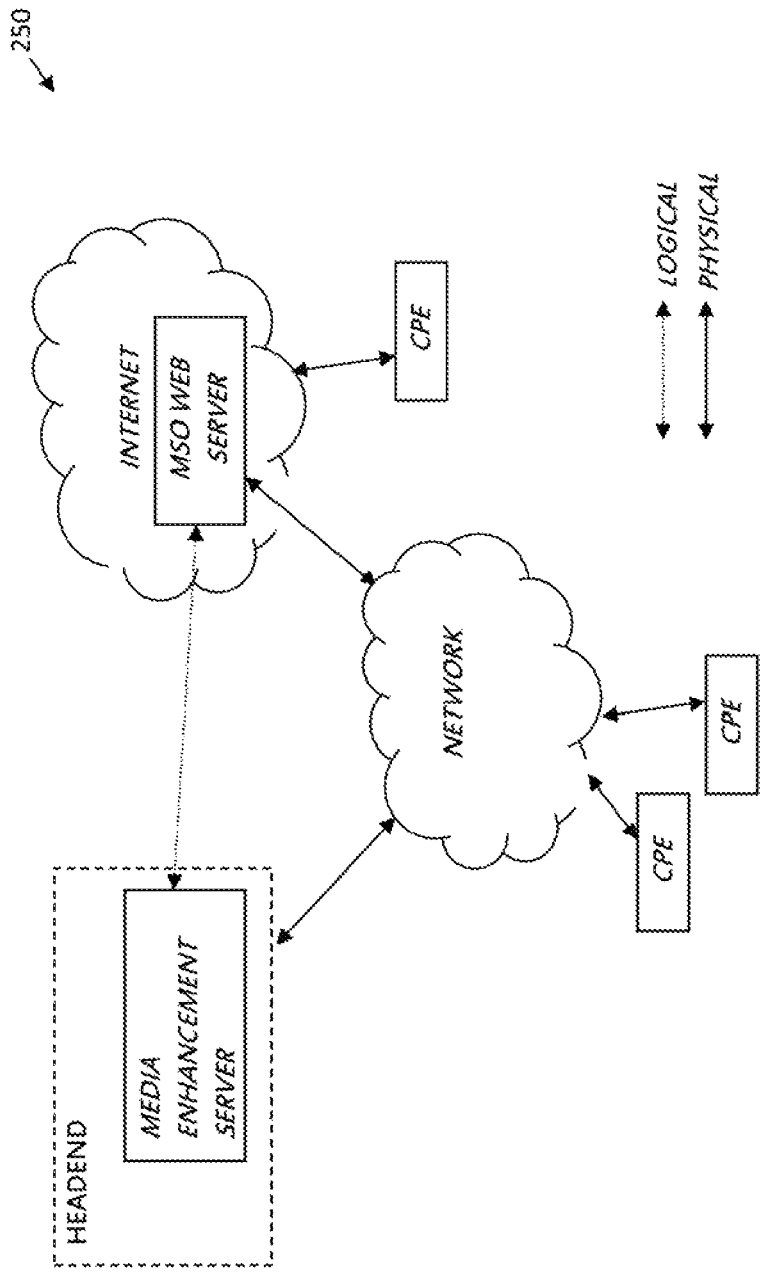
FIG. 2b is a functional block diagram illustrating another exemplary embodiment of a network architecture according to the present invention.

FIG. 2b illustrates another exemplary network architecture for use in the present invention. As shown, the network architecture 250 generally enables a user to establish a remote connection to the applications 204 at the media enhancement server 202 via an internet or LAN/MAN (such as the Internet) connection to an MSO-operated website (e.g., over a TCP/IP transport). Accordingly, the user may participate in any of the enhanced interaction functions described herein from outside of the MSO infrastructure.

Figure 2C:
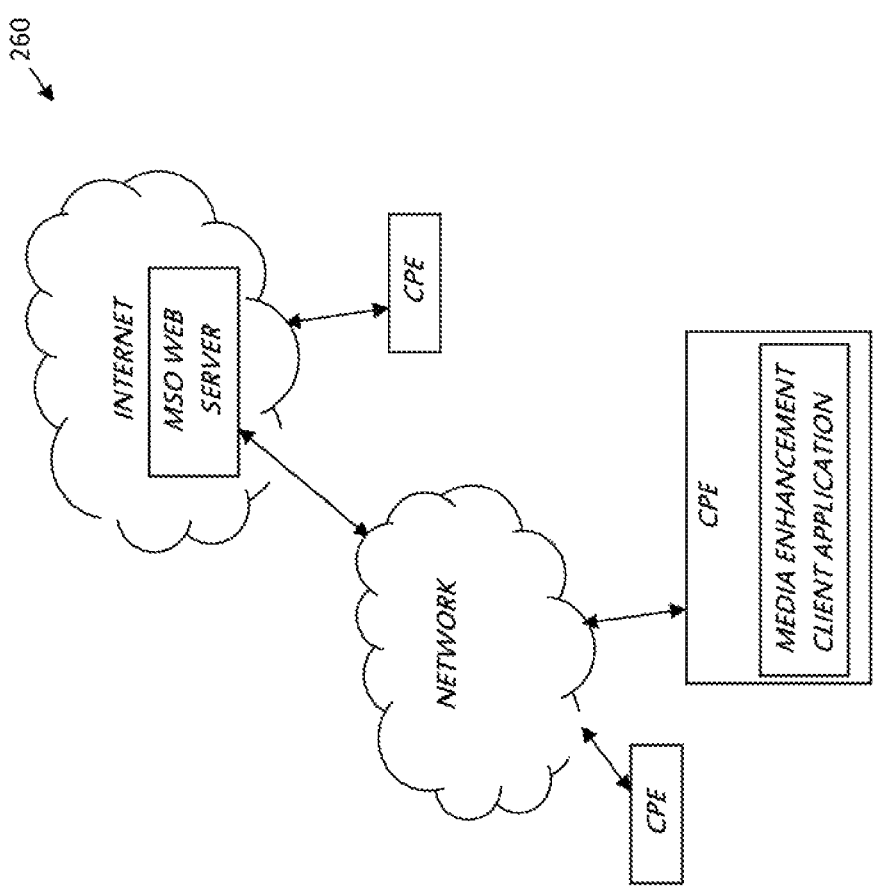
FIG. 2c is a functional block diagram illustrating yet another exemplary embodiment of a network architecture according to the present invention.

FIG. 2c illustrates yet another exemplary network architecture embodiment. As shown, the network architecture 260 generally utilizes a distributed media enhancement application. Hence, portions of the enhancement applications 204 necessary to perform the enhanced interaction functions are stored at a storage device of the client device associated with the user.

Any of the foregoing network architectures (FIGS. 2-2c) may be utilized to provide direct user interaction, participatory user interaction, group interaction, and anonymous interaction functions to subscribers. Each of the foregoing functions will be discussed in greater detail below, and may be further implemented using for example the apparatus and methods disclosed in U.S. Patent Application Publication No. 2011/0090898 entitled "METHODS AND APPARATUS FOR ENABLING MEDIA FUNCTIONALITY IN A CONTENT-BASED NETWORK", previously incorporated herein. As discussed therein, methods and apparatus are provided for enabling interactive media features or applications in a communications network (such as a cable or satellite network). In one embodiment, the invention provides a solution for integrating all IP based services offered by a network operator such as an MSO into a user's premises media delivery equipment (e.g., Home Video Service System). This integrated premises media delivery system and environment advantageously enhances the user's convenience and experience in interacting with a variety of different applications (such as those discussed above for direct, participatory, group, and anonymous interaction). This capability is enabled in part by leveraging premises broadband capability, as well as wireless capabilities on portable devices.

In one particular implementation, various ones of the foregoing interactive media applications are disposed at one or more headend entities (see e.g., FIGS. 2-2c). A servlet application may also be provided to facilitate communication between the various applications and one or more client applications resident on the user's premises system. The servlet, in one embodiment, acts as a proxy for communication between a client device and various media applications also located at or in communication with the headend. Users associated with the device may access the media features and applications using client software applications running on the client device. The client device and media enhancement server 206 communicate via the HFC network 101 either via an out-of-band upstream RF channel, an upstream DOCSIS channel, an upstream enhanced media application channel, or a separate transport such as a wireless or other IP network (not shown). In this manner, a user at his/her premises or client device, may access and interact with various ones of the applications in an integrated fashion.

In another implementation, individual ones of the interactive applications are in communication with an internet host server in order to obtain data therefrom, such as via a gateway 224 device located at e.g., the headend of the network. In other words, the gateway device 224 requests and receives internet data and/or content from the host servers on behalf of the media application(s). The data and/or content is then processed as required and, via the servlet, delivered to one or more client devices. For example, the content may be de-encapsulated from a first container format, and re-encapsulated into a second format for delivery to the client device. The content may also optionally be transcoded and/or transrated if desired.

One or more of the interactive media applications discussed below may be configured to utilize the Enhanced TV Binary Interchange Format (EBIF). Further, the client application running on the client device(s) may comprise an EBIF user agent (not shown). The user agent enables a user of the client device to view and interact with various EBIF pages of the particular media application(s) of interest.

Additionally, the foregoing network architectures (FIGS. 2-2c) may utilize the apparatus and methods for content delivery disclosed in U.S. patent application Ser. No. 12/764,746 filed on Apr. 21, 2010, entitled "METHODS AND APPARATUS FOR PACKETIZED CONTENT DELIVERY OVER A CONTENT DELIVERY NETWORK", and issued as U.S. Pat. No. 10,264,029 on Apr. 16, 2019, which is incorporated herein by reference in its entirety. In one embodiment, a substantially session-based and packetized content delivery approach (e.g., using the well known Internet Protocol) which allows for temporal, device, and location flexibility in the delivery of the content, and transportability/migration of user sessions (i.e., the "four-anys" previously described), as well as service/content personalization (e.g., on a per-session/user basis) and blending (integration) is utilized. This approach uses a common or unified delivery architecture in providing what were heretofore heterogeneous services supplied by substantially different, and often vendor-specific, networks and provides for enhanced content access, reproduction, and distribution control (via e.g., a DRM-based approach and other security and content control measures), as well as quality-of-service (QoS) guarantees which maintain high media quality and user experience.

In one exemplary implementation, the network is based on an IMS (IP Multimedia System) which includes SIP session protocols, as well as a Service Delivery Platform (SDP). The IMS/SDP also uses a common control plane and service layer, which advantageously provide a high level of service integration, and greatly enhanced opportunities for truly "blended" content delivery and service control. A subscriber is therefore able to participate in services spanning various ones of the aforementioned enhancement applications 204 as discussed elsewhere herein.

In another implementation, the network comprises both "managed" and "unmanaged" (or off-network) services, so that a network operator can utilize both its own and external infrastructure to provide content delivery to its subscribers in various locations and use cases. In one variant of this approach, network services are sent "over the top" of other provider's infrastructure, thereby making the service network substantially network-agnostic.

In another variant, a cooperative approach between providers is utilized, so that features or capabilities present in one provider's network (e.g., authentication of mobile devices) can be leveraged by another provider operating in cooperation therewith. Such features are useful in providing access to web or internet content as well as an ability to post information and content to an internet (as discussed herein below) via a mobile and/or premises content device.

The use of the above-referenced network architecture and enhancement applications 204 at the media enhancement server 206 for providing direct user interaction, participatory user interaction, group interaction, and anonymous interaction functions to subscribers is now described in detail.

Direct User Interaction—

In one embodiment, the network architecture 200 of FIG. 2 is utilized for enabling direct user interaction with content. The direct interaction includes interaction (including manipulation) with content by a single user. Various exemplary implementations of or models for direct interaction according to the invention are discussed herein below.

Figure 3:
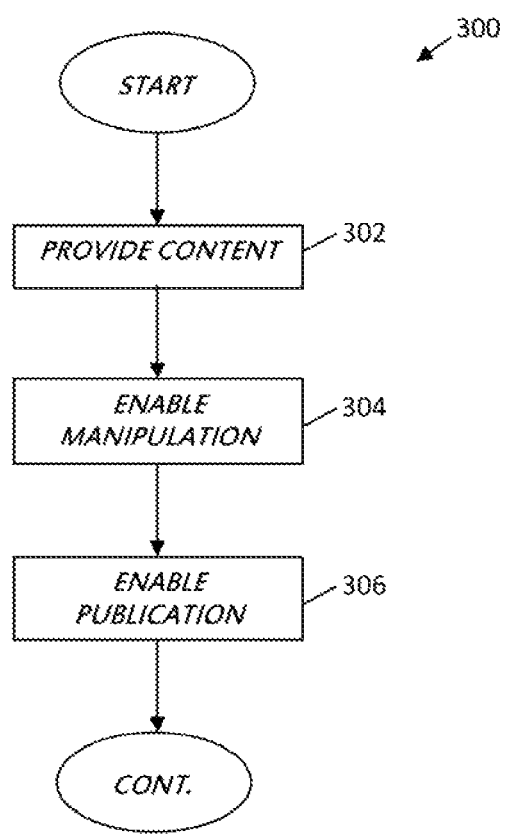
FIG. 3 is a logical flow diagram illustrating an exemplary embodiment of a method for direct user interaction with content.

One embodiment of a generalized method for direct interaction with content is illustrated in FIG. 3. As shown, the method 300 of FIG. 3 includes the steps of providing content to the subscribers (step 302), enabling individual subscribers to manipulate at least one aspect of the content (step 304), and subsequently enabling the individual subscribers to publish their manipulations for access by other subscribers (step 306). The particular manipulation performed by the individual subscribers may include for example enabling a user to (a) act as a content programmer, (b) create content clips, (c) identify and upload favorite quotes, (d) generate commentary, (e) select and or swap particular content elements, advertisements, and/or program channels, (f) create and maintain a music application, (g) create and maintain and advertisement registry, and (h) utilize a wireless dongle for content upload.

The direct interaction functions discussed herein may utilize one or more enhancement applications 204 in eBIF format (as discussed above). In addition, each may be performed by leveraging premises bandwidth to a consumer device at a consumer premises, as well as wireless capabilities on portable devices.

a. User Programmer

In one embodiment, the aforementioned network architecture 200 and apparatus may be used to enable a user to directly control the delivery of content by creating a playlist composed of e.g., currently broadcast content, recorded content, web or other network-based content, and/or user-generated content (i.e., that generated indigenously by the user, such as via their webeam or portable video camera or smartphone), etc. The playlist may include for instance complete content and/or portions of content (e.g., so-called "clips").

For instance, program and EPG information (such as from various content sources and/or the personal content server 220) is processed by the recommendation engine 222. Data from the recommendation engine is then supplied to an appropriate enhancement application 204 for providing a personalized EPG (such as that discussed in FIG. 3a below) to a user. In addition, content selections and content playback manipulation within the personalized EPG may be provided via e.g., other network headend entities. Web content and/or content from other networks may be accessed via the gateway 224 in communication with various internet content servers 232. The recommendation engine 222 may access popular web content (such as via e.g., YouTube®) and identify one or more content elements for recommendation to a particular user as well.

The methods and apparatus disclosed in the previously referenced U.S. patent application Ser. No. 12/764,746 filed on Apr. 21, 2010 and entitled "METHODS AND APPARATUS FOR PACKETIZED CONTENT DELIVERY OVER A CONTENT DELIVERY NETWORK", may further be utilized in various implementations of the present invention to ensure that the public availability of a particular subscriber's playlist does not contravene copyright and subscription regulations tied to particular content. In other words, when a first subscriber posts a publicly available playlist or publically available content, other subscribers which request to view the content are authenticated and/or authorized to access the content via a network implemented mechanism, to ensure that the copyright regulations and subscription or billing plan requirements of the other subscribers are met (e.g., that the content is not inappropriately copied or distributed, that the network operator's subscription structure is not subrogated, etc.).

Figure 3A:
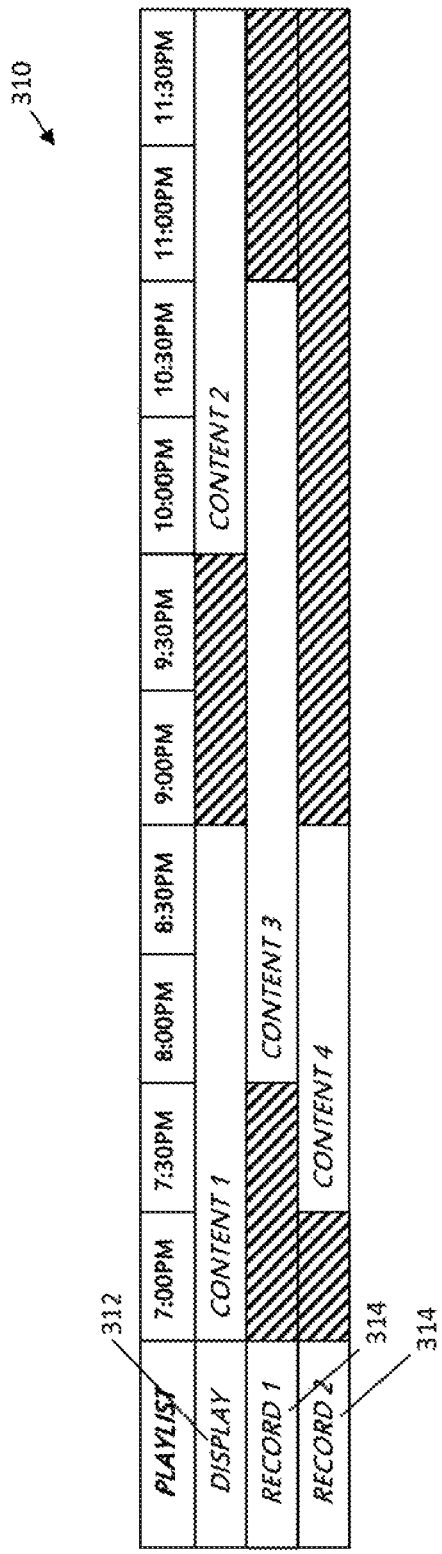
FIG. 3a is an illustration of an exemplary playlist creator interface according to the present invention.

As illustrated in FIG. 3a, the user is in one implementation provided a customizable electronic program guide (EPG) 310. In one embodiment, the guide is populated by recommended content, such as that identified using the methods and apparatus of co-owned U.S. patent application Ser. No. 12/414,576 filed on Mar. 30, 2009, entitled "RECOMMENDATION ENGINE APPARATUS AND METHODS", and issued as U.S. Pat. No. 9,215,423 on Dec. 15, 2015, which was previously incorporated herein by reference in its entirety. As discussed therein, content targeted to a particular user (or group of users) within a content delivery network, such as a cable television or satellite network, is identified and recommended. A mechanism for particularly selecting content to align with a user's preferences, demographics, psychographics, or other characteristics of interest (which may be entered by the user(s), or gleaned from other sources including user tuning behavior or interactivity, subscription/account information, feedback, etc.) is utilized for the content identification and recommendation. The content provided to the user may be compiled from various distinct sources, including, inter alia, DVR, linear broadcasts, VOD systems, start-over systems, IPTV sources, etc., and provided to the user via e.g., an EPG-based interface (such as that of FIG. 3a). Additionally, mechanisms to learn (and unlearn) the user's preferences and which content they are likely to enjoy based on actions taken with regard to the content are provided.

In another variant, the recommended content is based on a subscriber's viewing history and behavior. For example, data regarding viewing patterns may indicate that a subscriber has viewed a particular content in its entirety. The recommendation engine 222 may use this data to infer that the content was enjoyed by the subscriber. Then, using for example metadata describing the particular content (or some other metric or characterization of the content), the recommendation engine 222 may find additional content which is similar to the given content. For example, if the first content comprises an episode in a series, the recommendation engine 222 may, based on the users pattern of behavior during viewing of the episode, recommend other episodes in the series, or recommend other content (such as other programs, movies, or series) similar in genre to the series (such as comedy, drama, science fiction, horror, action, music, etc.). In much the same way, patterns of user behavior which indicate a subscriber did not enjoy a program may be used to target future recommendations. For example, if the subscriber tunes away from content (either immediately, or at some point during the broadcast) and does not return to the content, it may be inferred that the content was not enjoyed by the subscriber. The recommendation engine 222 will factor this into the metrics which are used to determine which content to recommend. For instance, if a subscriber often tunes away from horror movies, the recommendation engine 222 may refrain from providing recommendations in the horror genre. Likewise, if the user tunes away from the program stream containing the content at advertisement breaks, yet returns roughly contemporaneously with resumption of the content, then it can be inferred that the user is trying to avoid undesirable advertisements (or merely advertisements in general).

In the EPG of FIG. 3a, the user may be provided a list of recommended content at the indicated time periods. The user can then move the recommended content from one portion of the EPG or interface to another, so that it will be displayed 312, or recorded 314. Alternatively, the user may remove certain recommended content by removal from the EPG 310 back to the recommendation list, or remove content altogether. In other words, the user is given mechanisms for selecting content from a provided recommendation list to move in to a personalized EPG 310. The user may also move other, non-recommended content into the personalized EPG 310.

The user may in the exemplary implementation insert the content via a UI by inserting or moving the content within the timeline using a series of remote control keys such as arrows and "enter" key (or "dragging and dropping" if remotely accessing using a PC, tablet computer with a touch screen, or other such device, as described subsequently herein). Other selection mechanisms (e.g., other remote control buttons, textual commands, touch screen interfaces, etc.) may be used for these functions as well. Generating and updating the EPG 310 with user selections and manipulation may occur via e.g., a playlist generation and publication enhancement application 204e running on the processor 206 of the media enhancement server 202.

In a further variant, the EPG 310 may be pre-populated with recommended content, which the user may manipulate within the EPG 310. For example, the user may move a recommended broadcast program from its scheduled broadcast time to a future time in his EPG 310, thereby causing the broadcast version of the program to be recorded and a playback of the recording to be scheduled on e.g., a user's virtual channel. The recorded content in this instance may be stored locally (such as at a client device), or at a network headend in temporary storage or network storage dedicated to a particular subscriber (such as e.g., the personal content server 220). The same storage entity may be used for content which the subscriber manually places into the recording 314 portion of the EPG 310 or interface.

In one embodiment, the aforementioned virtual channel may be of the type discussed in previously referenced co-owned, co-pending U.S. patent application Ser. No. 12/414,554 filed on Mar. 30, 2009 and entitled "PERSONAL MEDIA CHANNEL APPARATUS AND METHODS", which is incorporated herein by reference in its entirety. As discussed therein, a substantially user-friendly mechanism for viewing content compiled from various sources, including, inter alia, DVR, broadcast, VOD, Start Over, etc., and particularly that content selected to align with a user's preferences, is displayed as a substantially continuous stream as part of a "virtual" user-based channel. The "virtual channel" acts as a centralized interface for the user and their content selections and preferences, as if the content relevant to a given user were in fact streamed over one program channel. In another aspect, client applications (e.g., those disposed on a subscriber's CPE and/or network servers) are utilized to compile the playlist based on user-imputed as well as pre-programmed user profiles. Various feedback mechanisms may also be utilized to enable the client application to "learn" from the user's activities in order to update the user profile and generate more finely-tuned and cogent recommendations. Client applications may also be utilized to manage the seamless presentation of content on the virtual channel, and locate/flag various scenes inside selected content for user viewing or editing or insertion into other streams or playlists.

Additionally, a user may establish a remote connection to the aforementioned client applications, EPG 310, and/or playlist via an Internet or LAN/MAN or other connection to an MSO-operated website (e.g., over a TCP/IP transport). Accordingly, the user may modify and create a future playlist, and remotely establish programs to record and/or be erased from an at home recording device (DVR, etc.).

The user-created playlists may additionally be published for public or semi-public viewing and joining via the playlist generation and publication media enhancement tool 204e. The user-created playlists and/or a lineup for a subscriber's virtual channel may be provided to e.g., the public at large, including via publication on an internet website associated with the MSO, to individual subscribers within a contact list, demographically or psychographically proximate group, and/or predefined geographic area.

For example, a particular subscriber may authorize other subscribers to view his virtual channel and/or playlist as "friends". In a similar manner, a shared playlist may be created across more than one subscriber account. In other words, a subscriber may enable certain authorized ones of the other subscribers to rearrange, add, or change content listed in a published playlist or virtual channel, including saving their own "version". In one exemplary embodiment, a celebrity or other entity of notoriety may publish playlists or otherwise enable their virtual channels to be viewable by other subscribers (including for a nominal fee). In addition, mechanisms are provided for a user to "subscribe" to another subscriber's playlist/virtual channel and thereby be notified of any updates on a daily, weekly, monthly, etc. basis.

Individuals may in this way gain notoriety or even a following for their content selections. In a further variant, targeted advertisements are placed within the content playout and/or on an interface used to simultaneously display the playlist or EPG 310. A portion of advertising revenue therefrom may be apportioned to the subscriber which created the playlist. Advertisement targeting is in one variant based on the demographics of the subscriber(s) which created the playlist and/or on the group of subscribers which tune to or are subscribed to the virtual channel created.

b. User Clips

In another variant, the media processing application 204c and playlist generation and publication 204e may be utilized for enabling the user to generate a "clip show". For example, the user can pull clips from his DVR, broadcast programming, user-generated content, internet content (e.g., YouTube), etc. and create a segregated or seamless compilation thereof.

In one embodiment, a user may additionally modify the content or clips by adding voice commentary, overlay of user-generated video, alternate audio, and/or overlay text or graphics via the media processing tool (application) 204c. For example, a user may use e.g., a web-camera, microphone, keyboard, mouse, touch screen, and other accessories in communication with the consumer device (such as e.g., a PC, laptop, tablet computer, STB, mobile device, etc.) to create live or scripted reactions, discussion, enhancements to live or stored content.

In addition, the enhancement applications 204 may include a mechanism for generating a user interface. The user interface is configured to enable, inter alia, subscribers to browse other subscriber's clips or annotated content. A search feature may be provided such that metadata associated with the particular content clips or annotated content, the user which generated the clips/content, any text or annotation contained in the clip/content, etc., can be used as a basis of user-friendly searching, such as via a network-based search engine provided by the network operator, or a local engine resident on the user's CPE. In one variant, a searching user (who is authorized to search a target user's materials) can invoke a search of the latter by accessing a search routine on the target user's CPE or mobile device, configured to run in the background thereof so as to not interfere with user experience or operation of the target device. Any results are then returned to the searching user via e.g., upstream message that is routed to the searching user via Internet, at the edge infrastructure of the managed network, or by other means.

Additionally, the subscribers can use the aforementioned interface to generate the clips or clip show, and upload these to other social media sites as well as to an MSO-operated site (via the publication application 204e).

In order to enable the forgoing functions, the subscriber is in one embodiment provided (via the aforementioned media processing application 204c) appropriate software tools in a user interface which enable the subscriber to, among other things, mark or flag a starting and stopping point within a content element (e.g., one stored on the user's DVR or other storage device). The start/stop or other annotations may also be performed "live" (e.g., on linear content as it is broadcast, or on Start Over or other such content. In one embodiment (as discussed elsewhere herein) a portion of the enhancement applications 204 necessary to perform the herein described clips upload is stored at a storage device of the client device associated with the user. The enhancement application(s) 204 cause data within the flagged portion to be copied and stored as a clip, such as in a designated format (e.g., Apple Quicktime, Windows Media, MPEG-2, MPEG-4, etc. encoding). The clip is then packetized and uploaded (upon user request) to other media sites (such as e.g., Facebook®, Twitter®, MySpace®, etc.). In this manner, a subscriber need not search the Internet for a particular clip (such as a clip from last night's episode of Jimmy Fallon), but instead the subscriber may view it directly from one of the aforementioned social media sites (either from someone the user "follows" or has as a "friend"). This also allows the searching user to avoid advertisements associated with such Internet sources (e.g., the annoying advertisements that currently precede playout of many on-line videos).

It will be noted, however, that the herein described clip uploads can be used to generate advertising revenue for an MSO operating the media enhancement server 202 (which provides there aforementioned user tools and interfaces), such as via the aforementioned targeted advertisements that are present on the user interface.

In a further variant, the system enables indexing of the identified clips in order to use these to reference against content stored in the managed network. In other words, as opposed to copying, packetizing and uploading a content clip from e.g., a locally stored version of the full-length content, metadata regarding the identified content and the user-placed markers or flags is transmitted to the network. The network uses this information to identify the referred-to content, generate the requested clip, and provide the same to the identified social media site (or alternatively to the user for user directed upload thereto). Not only does this variant relieve data upload requirements at the user device, but additionally allows users interested in viewing a clip to download the content of a clip from a "single" data source (i.e., the network headend) as opposed to multiple e.g., peer or edge sources. This option also gives the network operator greater control of possible advertisements or other secondary content for insertion into or alongside the clips, and provides a mechanism for enabling the network operator to control the use of content in order to avoid potential copyright infringement issues.

In yet another variant, the user interface enables the subscriber to add tags to content clips for rapid sorting/ searching of media. For example, a subscriber may tag content as e.g., "#funny", "#conan", "SuperbowlCommercials", etc. Subsequently, the subscriber can recall all clips having an appropriate tag, which can be used to generate a stream, etc. Subscribers may also share content by tags with other subscribers or "friends" and/or "followers" using the previously referenced social media sites.

c. Favorite Quotes

In much the same manner as that discussed above with respect to the user clips, a text capture mechanism may be provided to instantaneously provide movie quotes for easy publication to the aforementioned media sites.

In one embodiment, media enhancement tools 204 provided at the user device or headend entity enable the user to access (via a user interface) a text version of the audio of a given content element or segment. This may be provided via e.g., extant closed caption mechanisms, and/or user or content source-managed databases. Mobile device "text" mechanisms may also be used. For example, if a user is watching an episode of The Simpsons and hears a phrase or quote of interest, the user can, via a user interface, easily retrieve a text version of the audio clip, and cause it to be placed as an update to the subscriber's Facebook or other media page, or to be texted to other subscribers/users. In one variant, the user interface may provide rolling text display during playback of content which the user may access, select from and post. This approach is advantageously can be much faster and less tedious than searching the Internet for the quote to post to e.g., Facebook and/or guessing at the precise wording of the quote, and typing it into Facebook.

In yet another embodiment, the system is configured to copy an audio clip and provide the same to another user device (or for upload to a social media site). Similar to the methods discussed above, the user may flag a start and stop point within the audio portion of content playback. The flagged portion is then identified, copied, and transmitted. In one variant, the audio clip is transmitted via a gateway apparatus to a cellular provider network associated with the user's mobile device. The user may then use the clip on the mobile device, such as employing the clip as a ring tone.

d. User Commentary

In a further embodiment, the user may further manipulate content by creating a running commentary to accompany any content the user chooses, via the media processing application 204c. For example, the user may play the role of an active viewer to content by chiming in with jokes, information, etc. during a content playback. The creator may in some instances be a celebrity (such as an actor, director, etc. of the program) or may gain notoriety via the commentary.

The commentary may be audio only, or may also include a video portion (such as webcam video of the user as he/she watches and comments on content, so as to see his/her reaction to the content, facial expressions, etc.). For example, a first subscriber may in conjunction with a particular movie, record (via a microphone and webcam or similar devices) audio and/or video commentary to accompany the movie, which can then be distributed for use by others.

Once created, the user uploads the modified content to the network for publication and viewing by other subscribers via the playlist generation and publication application 204e. The user-modified content may be uploaded to e.g., a content provider managed website or any of the previously referenced social media sites. In the instance a video portion is provided, it may be displayed simultaneously with the specific content to which it refers using e.g., a picture-in-picture or other minimally intrusive display configurable by the user which creates the content and/or by a viewer thereof.

In one variant, the commentary is segregated from the content such that it can be sent independently; this obviates having to send the content and commentary (thereby consuming much additional bandwidth). The commentary may be synchronized to the content using any number of well-known mechanisms (e.g., SCTE cues, etc.) so that a subscriber receiving another's commentary for a particular content element can synchronize it or overlay it onto their own (e.g., DVR-based) version of the content.

Viewers of user-generated commentary are in one implementation offered an opportunity to rate other user uploads. For example, the viewers may rate based on comedic value or performance, truthfulness or accuracy (such as of news commentary), or overall thoughtfulness (such as of political or social commentary) of the creator/subscriber with respect to his/her commentary. In addition, subscribers may be afforded an opportunity to interact with other subscribers during a live commentary, such as via video conferencing, text-based chat or instant messaging, Facebook, blog, etc.

In some embodiments, multiple commentary streams can be multiplexed simultaneously. For example, a subscriber may be interested in commentary from multiple pundits during a program segment. In some variants, a ranking or prioritization scheme may be additionally used so as to ensure that commentary is displayed according to e.g., relevance, user interest, a popularity index, etc.

In some cases, the commentary streams may be provided for a first program segment, even where the subscriber has tuned away from the first program segment. Tuned-away commentary may monitored by the subscriber such that they can return to the first program segment at a point of interest (e.g., keyed by a phrase "and now to the coin flip", etc.). Still further, it is appreciated that the commentary may act as a "timeline" where the subscriber can replay the program stream starting at a corresponding comment (or an amount of time before or after a selected comment).

In one such variant, the commentator may additionally receive information regarding their subscribed demographic. Such information may be direct (e.g., population information, subscriber feedback, etc.) or indirect such as e.g., monetary rewards, credits, etc.

e. Show, Advertisement, and Program Channel Selector and "Swap"

As discussed above, the exemplary apparatus and methods of previously referenced co-owned and co-pending U.S. patent application Ser. Nos. 12/414,554 and 12/414,576 may be further utilized according to the present invention to enable a dynamic selection of content items (including advertisements) for inclusion on a playlist or virtual channel. The selection of content is performed via e.g., a recommendation engine 222 which is configured to learn and unlearn subscriber preferences based on interaction with content.

In much the same way, customized program channel packages may be created consistent with the present invention. Data regarding a user's interaction with various program channels is generated and utilized to recommend a tailored program channel package, including those channels which it would appear (according to the collected data and/or user input/preferences) the user would be most interested in receiving. For example, data may be collected regarding which program channels the user spends little to no time on, and may recommend dropping that channel from the user's subscription package or lineup. If the data indicates that channels carrying particular content are often selected by the user, the recommendation engine may not only recommend keeping those particular channels, but may also recommend channels which carry content similar to that carried on the identified channels. For instance, if it is known that a subscriber often spends time on a program channel for the Home Shopping Network, the system may recommend adding the program channel for QVC to that subscriber's lineup. In addition, patterns of behavior as these correlate to time of year, time of month, day of the week, part of the day, etc. may be identified and utilized for recommending program channels. For example, if a subscriber generally watches sports-related program channels only during football season and otherwise is focused on news-related program channels, the recommendation engine may recommend sports channels be added to his program lineup during one part of the year and news channels be added during the other portions of the year. Accordingly, dynamic and customizable program channel packages are provided to viewers based on actual information obtained from that user's interaction with the content of the program channels.

In another variant, channel "swap" among two or more subscribers of a managed network is provided. In this variant, a first user (Subscriber "A") may have a given channel package/lineup that is available to them. A friend, family member, etc. who is also a user/subscriber (Subscriber "B") also has a package, yet with somewhat differing channels available. As noted above, the exemplary recommendation engine may determine that Subscriber A never watches QVC (and hence that channel might be recommended for dropping/replacement), while Subscriber B frequently watches Home Shopping Network, yet does not receive QVC as part of their (Subscriber B's) package. Hence, the recommendation engine(s) may identify (i) the predetermined relationship between the Subscribers A and B (such as e.g., via each being in the other's "friends/family" list, or affirmatively being selected for the other's channel-swapping function/program); (ii) identify that Subscriber B is not presently being offered QVC, but that QVC would ostensibly be of interest to that Subscriber; and (iii) that Subscriber A does not watch QVC. Accordingly, with the channel swap function enabled, the Subscribers could approve a channel exchange or allocation such that Subscriber A no longer receives QVC, but rather gives it to Subscriber B for use in their package. Such allocation can be readily accomplished in a managed network such as a cable or satellite network using extant technology (i.e., simply enabling one user to view it, and disabling the other user (Subscriber A in this example) from viewing, subject to bandwidth or any other relevant operational constraints.

The foregoing allocation may be in exchange for another channel (e.g., Subscriber B may receive something of interest to Subscriber A which Subscriber A does not then receive, and exchange that for the allocated QVC channel). In another variant, the allocating subscriber (Subscriber A) may receive a subscription credit or other consideration for a one-way allocation; likewise, Subscriber B can feasibly be charged an additional fee for the "extra" channel. In the case of an allocation, there is in effect a net gain/loss of zero (same number of subscribers are ostensibly receiving QVC after the allocation), so in one model no credit/fee is required.

It will be appreciated that the foregoing functionality can also be implemented in the context of a single subscriber; i.e., Subscriber A can simply gain or lose channels based on e.g., the recommendation engine culling them from the user's lineup based on lack of activity/interest. In this fashion, a "rolling" or dynamic subscription package function is created which advantageously keeps the user's channel lineup relevant and "fresh".

Moreover, the foregoing "swap" functionality can be implemented temporarily or for any desired period of time; e.g., for one day, one week, etc. For example, during football season, Subscriber A (who dislikes football) may give their football related channels to Subscriber B, in exchange for e.g., Subscriber B's cooking-related channels.

The swap approach can also employ leveraging of sorts; e.g., multiple lesser-tier channels can be swapped for one "premium" channel, and so forth. Advertising content can also be considered as a metric; i.e., two channels with higher advertising content for one channel with fewer advertisements per unit time.

The foregoing approach also may also generate a subscriber "synergy" of sorts and more efficient use of network resources. Specifically, in a managed network with finite delivery resources, it is de facto wasteful of these resources to deliver repetitive or duplicative content when such content is not being utilized by each subscriber or user to which it is delivered. Applicant's aforementioned "broadcast switched" or "switched digital" technology referenced supra addresses this wastefulness to some degree; in effect, channels that are not being watched by a given user are switched-out from delivery to that user, thereby conserving bandwidth. The "swap" approach of the present invention provides in some cases a supplement/complement to such switching. While evaluating channels for possible swap with other users, a given user may also "cut out the dead wood" as it were (i.e., drop certain channels altogether that they never watch, such as for a credit on their subscription), thereby pruning excessive and unnecessary bandwidth consumption. Moreover, the sharing approach described above allows two or more users to utilize a common channel, thereby obviating delivery to all simultaneously. For example, the two or more users may time-share a channel (e.g., Subscriber A on weekdays, Subscriber B on weekends, etc.), akin to prior art TDMA techniques in telecommunications or data networks.

Hence, subscribers can, via swap, sharing, or "pruning", tailor their content packages to be more precise, and hence avoid delivery of channels or content that they have no desire seeing. This functionality is largely enabled via the various "social" aspects of the present invention; i.e., the ability for two or more subscribers of a common managed network to interact and collaborate.

f. Music Application

In a further variant, the user's content experience may be enhanced by utilizing the aforementioned recommendation engine 222 (i.e., learning/unlearning) to establish a subscriber-specific music channel. That is, a user's tastes or preferences regarding music stored at the user's devices, the subscriber's music available "at the cloud" (for example iTunes, etc.), content requested via a network provided music channel, music searched for via a user interface to the managed or an unmanaged network, content available on the user's personal media device or PMD (e.g., MP3 player such as iPod), etc. are used as data for the processes running on the recommendation engine. The system also enables music storage at the managed network, so as to enable the subscribers to upload their CD's or MP3's to be shuffled in with other recommended music content.

Utilizing the media processing application 204c discussed above, the subscriber may further append music content to include additional information, content, etc. For example, the user may retrieve a music video associated with the uploaded (or cloud) content, and assign the music video to the appropriate song. In this manner, a user can create a customized playlist of songs with additional videos, pictures, information, lyrics, and/or other enhanced content. The video need not necessarily be a "music" video (i.e., one that is directed at a particular song); rather, the user can in one variant may ad hoc associations between songs and other media. Furthermore, as discussed above, the user's playlists may be published and accessible by other subscribers, such as via e.g., user-generated music playlist broadcast channels, MSO websites, etc.

g. Advertisement Registry

The user-created playlists may, in another embodiment, comprise a list of items identified from content viewed by the user. For example, as a subscriber watches advertisements or programs over the course of time, the subscriber is provided media enhancement tools 204 to select products and/or services and place these in a gift registry or "wish list".

Access to a subscriber's playlist may be afforded to parties identified by the subscriber or having a known relationship to the subscriber. For example, in one variant, friends and family are provided access to the subscriber's wish list upon affirmation of the requesting party by the subscriber and publication of the list thereto (such as via the playlist generation and publication list 204e).

Items on the wish list may form the basis for further advertisements and recommendations. For example, if the subscriber has added a sweater from Banana Republic to his/her wish list, the recommendation engine 222 may use this information to further suggest other sponsored clothing items for placement on the subscriber's list, and/or suggest items to the person viewing the subscriber's list.

In another variant, the subscriber may also create a "shopping list" based on advertised items, and elect to have this list provided to the subscriber's mobile device, etc., so that when he/she goes to the store, he/she will have particular products in mind to purchase.

Moreover, it is appreciated that in some embodiments, an advertisement registry may be provided or dynamically generated with programming. In one such example, celebrity outfits pertinent to a program can be provided in a tabulated list form (e.g., description, manufacturer, price, material construction, alternate color schemes, etc.), such that a subscriber can selectively add various pieces to their wish list. Moreover, it is further appreciated that such a scheme can be combined with various product placement advertising regimens, etc.

It is further appreciated that in some cases, the advertisement registry may be a crowd-sourced listing of items. These crowd-sourced lists may be further prioritized, and/or filtered according to e.g., friend lists, trusted experts, location, etc. In one such example, a subscriber can post and/or view information (e.g., price, retail location, review, etc.) related to e.g., a celebrity outfit, a gadget show, etc. For ease of browsing, these lists may be provided in a categorized and/or searchable format.

h. Wireless Dongle

As discussed above, the foregoing methods and apparatus enable a subscriber to program content for his own channel (i.e., virtual channel) by incorporating broadcast content, recorded content, user-generated content, and content from non-managed networks. However, using the existing upstream HFC network to get user-generated content (and/or content from the subscriber's DVR) up to a network storage entity can in certain cases be inefficient. Accordingly, in another embodiment, the MSO issues subscribers a WMAN (e.g., WiMAX) dongle which works with the subscriber's mobile device or other user device to enable the subscriber to upload content at higher rate (instead of using upstream bandwidth on the managed network, which may be limited). The WMAN "upstream" bandwidth is high (in effect, acts as a separate data pipe from that of the managed network infrastructure), and is wireless, thereby enabling users to upload (and distribute) content more flexibly and rapidly. The uploaded content is then able to be downloaded to other users of the managed network via the extant managed network infrastructure download capability (much larger bandwidth than upstream), and/or the WMAN wireless download channel(s).

Alternate high-bandwidth wireless data pathways may be used as well consistent with the invention. For example, WLAN (e.g., 802.11) and/or 4G data services (e.g., LTE, LTE-A) can be used as a parallel data channel, such as by sending (or streaming) content to an MSO-based server from a Wi-Fi or LTE-enabled smartphone or tablet.

It is noted that each of the above-disclosed direct user interaction features may be accessed via a mobile device (such as using the network architectures of FIGS. 2a-2c). In addition, utilization of the high bandwidth capabilities of the extant network advantageously enables upload of manipulated content, upload of user created content, transmission of data and metadata regarding identifiers (such as identifiers of a user's interest in a particular product, identifiers of starting and stopping points within content, etc.) and transmission of information regarding a user generated playlist or channel as described above.

Participatory User Interaction—

Figure 4:
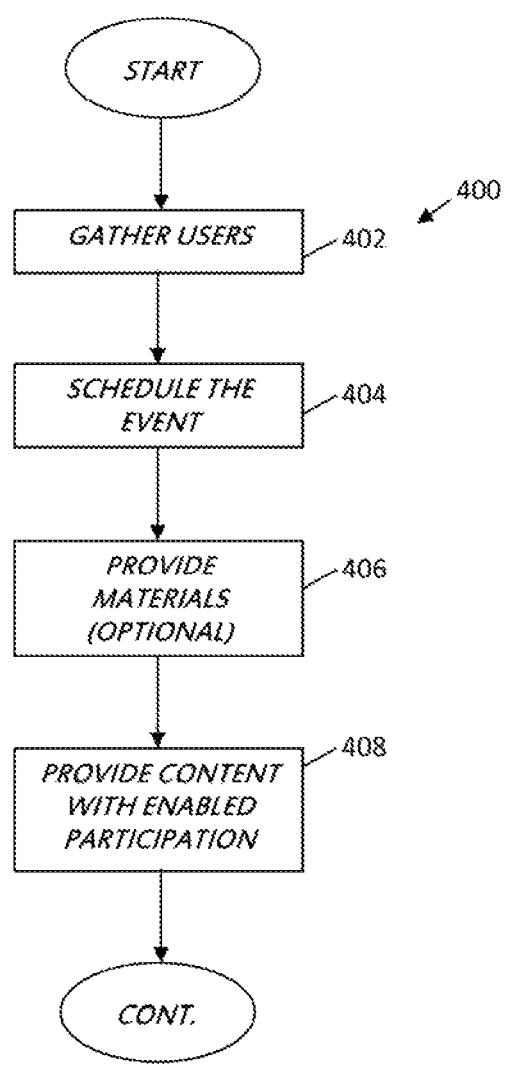
FIG. 4 is a logical flow diagram illustrating an exemplary embodiment of a method for participatory interaction with content.

In one embodiment, the network architecture 200 of FIG. 2 is utilized for enabling participatory user interaction with content. Participatory interaction refers to providing the user's an ability to interact with content in a way that he is involved in or otherwise joins in the substance of the content. Various embodiments for participatory interaction are discussed herein below. One embodiment of a generalized method for participatory interaction with content is illustrated in FIG. 4.

As shown, the method 400 of FIG. 4 generally includes gathering a plurality of users interested in participating in a given event (step 402), scheduling the event (step 404), optionally providing any materials necessary for the event (step 406), and subsequently enabling the individual subscribers participate in the scheduled event (step 408). The particular events may include educational events, gaming events, group program viewing, dating, etc. These and other user participation events will be discussed in greater detail subsequently herein. In one embodiment, participation may include at least providing an option to enter a message board, chat room, or video chat room to discuss an event in which the user is participating.

As noted above, enhancement applications 204 discussed herein with respect to the participatory user interaction functions may be provided in e.g., eBIF format. It is further appreciated that the participatory user interaction functionality discussed herein may advantageously leverage premises bandwidth within a network to provide both content and data relating to a simultaneous interaction therewith. The herein-described features may be accessed wirelessly via portable devices as well.

a. Cooking Channel

In one embodiment, the user participation event comprises a cooking channel. According to this embodiment, a subscriber signs up (such as by registering online at an MSO managed website, or via a user interface directly at the user premises device) for a particular episode, week, season, genre (e.g., pastry), etc. of a cooking show.

Upon registration, the subscriber is presented options for receiving (via USPS mail, FedEx, UPS, etc.) items which will be required for the particular episode. The subscriber may elect in one variant to receive individualized portions of episode-specific ingredients, individual ones of the ingredients (such as if the user knows he/she already has certain ones but not all of the ingredients), etc. Specialized or user specified cooking equipment may also be provided. For example, a user interface listing all of the ingredients and necessary equipment and/or tools for a given program or segment may be provided in the form of a checklist; the user may then check those items which he/she would like to receive. The user may be billed separately or via their normal managed network subscriber bill for the selected items. The provided ingredients may be full-sized products (such as those available at a grocery or other store), or may be pre-portioned for the given recipe or episode (thereby economizing on the subscriber's time and expenses). They may also be configured for disposal; e.g., one-time use containers, such as paper or plastic tear-open containers that cannot be reused. Hence, at the time the show broadcasts, the subscriber is fully prepared to follow along (i.e., has all of the ingredients, and has them readily at hand).

The subscriber may also be offered a discount if he/she elects to make the same recipe a second time with these same ingredients; the discount may apply to the ingredients themselves, and/or the program content (i.e., the cooking show episode).

Another aspect of this embodiment is the ability of the managed network to additionally provide targeted advertisements which align to the types of ingredients or tools needed for the show. For example, at the point in the recipe where olive oil is required, an advertisement or pre-placement of a certain brand of olive oil may be provided. Other advertisement opportunities are also available, such as e.g., partnering with a "sponsor" product for one or more recipes or episodes.

It will be appreciated that the foregoing scenario may be implemented based on a linear model (e.g., the cooking show is broadcast at a prescribed time/date), or a recorded model (e.g., nDVR, local DVR, Start Over, etc. In one variant, the user is enabled to move the cooking show around in time to suit their schedule; e.g., three hours before dinner guests arrive on a given day. In this fashion, the user can coordinate the actual cooking event with a desired event (dinner party), so as to obtain the maximum benefit therefrom. To this end, the checklist, user interface, etc. may be configured to include an estimated "start to finish" time or other temporal estimate to help the user asses how long it will take to produce a finished, edible product.

In alternate embodiments, the subscriber can purchase the "kit" and play the show at their leisure in a Video On Demand (VOD) stream. In other words, the user may pay a single price for the program content, the ingredients/tools, etc., and is then able to play the episode at his/her convenience. Conceivably, multiple VOD/kit combinations could be subscriber selectable, enabling the subscriber to piece together a full meal (if desired). Additionally, mechanisms for enabling searching of a database of recipe episodes (such as by meal type, main ingredient, holiday, etc.) is provided.

In one variant, a cooking episode is broadcast (as opposed to using a VOD or other OD or recorded delivery mechanism), thereby enabling the subscribers to live chat with the host/chef using webcam, video, audio, and/or text options such as via the media processing application 204c. The subscribers may also be able to live-chat with other subscribers simultaneously watching the program (whether during the pre-scheduled broadcast, or at the time the subscriber re-plays the episode from a DVR or network storage (e.g., VOD)).

The foregoing methods and apparatus may additionally be utilized to provide dedicated programming content and in advance provide requisite materials for other activities such as e.g., knitting, crafts, beer or wine making, painting, drawing, musical instrument lessons, auto repair, home improvement, etc. The foregoing methods and apparatus are especially useful for esoteric hobbies for which it is often difficult to find other people who are interested, in that it obviates having to find local like-minded individuals or clubs/organizations, and physically gather with these people at a designated site away from the subscriber's premises.

In yet another variant, the subscribers can, using for instance a text or audio/video feed, send in questions/comments regarding the live episode, and responsively receive a chat window with an "assistant chef" in a picture-in-picture (PIP) or other display to resolve their issues. In one such variant, the live chat ongoing topics are further listed for all viewers (such as by question or topic), the viewers are able to selectively tune in to the PIP answers (or review audio/video/text of answer session which have since ended).

b. Exercise/Workout Channel

In another embodiment, the aforementioned media processing application 204c may be further utilized to enable webcam/video feed to be uploaded from one or more client devices for generation of a personal training exercise session. For example, a subscriber may tune to a broadcast exercise "episode", upload webcam or other video data to the network, and receive in return a modified video feed of the episode and the subscriber's webcam feed, as well as a webcam feed from other subscribers also tuned to the "episode" (such as in a PIP, thumbnails, or other minimally-invasive overlay).

In one variant, a personal trainer performs the exercises, and the subscribers follow along. Through the use of the subscriber webcam/video feeds uploaded to the network and provided to the trainer's video feed, the trainer (or other people having access to the feed(s)) can motivate the subscriber, tell them what they're doing wrong, etc. The media processing application 204c may enable the user at e.g., a user interface, to manipulate a display of the modified video feed (i.e., the episode and subscriber webcam feeds) so as to enlarge, shrink, move, etc. various ones of the feeds.

In one variant, the costs associated with the training sessions may be spread across a plurality of users or "friends", so that each receives a discount over what he/she would pay for an individual session. The so-called friends may be physically located in the same space, or electronically linked in a single session as discussed above. These users may have no relation or correlation with one another (e.g., may be just random users desiring to engage in the session), or may have a pre-existing relationship, the latter which may be used to identify them in the first place, identify other complementary offers or items of interest, select targeted advertising, etc.

c. Live Chat and Video

In another implementation, video and/or text messaging is enabled during a program. The messaging can be open to the public, so that a subscriber may join other subscriber's conversations, or can be limited to only previously identified "friends", family, etc. The friends may be determined, in one embodiment, via a decision-making process 204a at the network which communicates with internet servers 232 to access linked account information. For example, a subscriber's Facebook friends may be cross-referenced a list of subscribers to a managed network; where they intersect (i.e., where the same person is both a Facebook friend and a subscriber to the managed network), the decision making process 204a can provide the list for approval to subscriber. Alternatively, other subscribers may be identified using e.g., the previously referenced recommendation engine 222 and based on demographics and overall similarity in television viewing patterns.

In another variant, only pre-approved subscribers or user may engage in the text/chat, such as those who have been vetted for credibility/suitability for contributing, those having a particular expertise, etc.

d. Educational TV

A further embodiment of the invention enables educators to designate mandatory educational television programming (such as through the previously described user/programmer virtual channel) as well as content generated by the educator. The educator-provided content may include e.g., video uploaded by the educator via the playlist generation and publication application 204e of that teacher or other teachers giving a lecture. This allows the educator to aggregate discontinuous content (i.e., from different sources).

In a further embodiment, the MSO may provide in advance or subsequent to the VOD or broadcast educational "episode" materials for testing or quizzing the student viewers. The materials may be physical paperwork, which is returned directly to the educator or to the educator via the MSO (such as by direct mail, email, etc.). In addition, the reporting application 204d may be utilized to record and report completion of viewing of the educator identified or uploaded program(s). Quiz completion reports and reports regarding minutes or hours viewed are generated at e.g., the reporting application 204d and are provided to the educator. Additionally, the educator could moderate the stream and provide commentary, answer questions, etc. for the students as they view the content live via webcam video/audio and/or text (e.g., IM).

In some variants, the educator may limit the student's ability to replay the content. For example, testing programs may require the student to provide the correct answer within a designated period of time. Similarly, certain statistics may be useful for the educator (e.g., time spent viewing, average viewing length (mean, median, variance), etc.) so as to assess student requirements and/or provide feedback on student study habits.

e. Television Roulette/Dating

In yet another embodiment, the systems and apparatus of FIG. 2 may be utilized to join two or more subscribers in a "television roulette" experience. This concept uses webcam video/audio and/or text-based messaging (such as instant messages) to enable communication between randomly joined subscribers as they view the same or different programming content. The subscribers may be selected in one variant randomly or pseudo-randomly by using a randomizer application 204b (which may be limited if desired by certain age, location, physical preference, and other restrictions), thereby adding an element of excitement and surprise. This randomized approach is in stark contrast to extant approaches to (online) dating, which often attempt to make the best match between two people. Moreover, it adds a level of security/credibility to the selections; i.e., a given person knows that the person they are provided is at least known to the MSO, and hence his/her personal information is known and accessible to e.g., law enforcement in the event of problems.

Alternatively, subscribers may be joined based on information obtained from viewing patterns and account information (such as e.g., identified mutual interests, demographics, geographic nearness, etc.) via the recommendation engine 222, or based on information entered by a user (similar to a dating website) using a decision making process 204a. Pairing may be conducted only with users who are actively connected to or interacting with the network at a given time, only those watching the same program channel at the same time, etc., in addition to or in place of the foregoing criteria also.

The media enhancement server 202 enables video/text chatting (including sending pre-determined "getting to know you" questions) either during a program or only during advertisements or breaks. In one variant, a user interface for the subscribers may provide a mechanism for either subscriber to disconnect and/or be re-matched such as e.g., by pressing an exit button.

In addition, the program content which the two or more subscribers view may be selected randomly using the randomizer 204b. For example, a user may select to join the so-called "television roulette" or dating service, be assigned a random or pre-matched viewing partner and a random television program for viewing. The subscribers may independently change one or both of the program content and/or the viewing partner. Alternatively, the random viewing partner(s) may be assigned based on a shared interest and viewing of a given television program.

It is further noted that each of the above-disclosed participatory user interaction features may be accessed via a mobile device (via e.g., the network architectures of FIGS. 2a-2c). In addition, the high bandwidth capabilities of the extant network advantageously enable the simultaneous transmission of content downstream to devices as well as two-way communication required for participation (such as video/audio/text from particular ones of the user devices) as described above.

Group Interaction—

Figure 5:
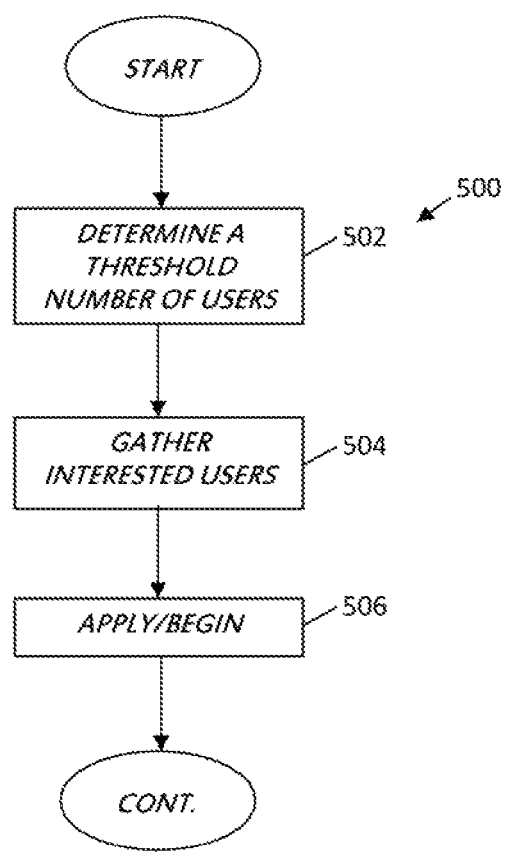
FIG. 5 is a logical flow diagram illustrating an exemplary embodiment of a method for group interaction with content.

In one embodiment, the network architecture 200 of FIG. 2 is utilized for enabling group interaction with content. Various embodiments for group interaction are discussed herein below. A generalized method for group interaction with content is illustrated in FIG. 5.

As shown, the method 500 generally includes determining a threshold number of users needed for participation in a given event (step 502), interested users are then gathered (step 504) until the threshold number is met, and one the threshold number is met the event is begun or applied (step 506). The particular events may include advertisements, discounts, or games. These and other exemplary group participation events are discussed in greater detail below.

As noted above, enhancement applications 204 which enable group interaction with content may be provided in e.g., eBIF format. Furthermore, the high bandwidth availability of a premises network is leveraged by the group interaction functions in that the group interaction with content utilizes the bandwidth not only for delivery of content, but also for providing data relating to interaction therewith by the group. It is further appreciated that the herein-described features may also be accessed wirelessly via portable devices utilizing the apparatus and architecture disclosed above.

a. Rotating Advertisements

In one embodiment, the group participation comprises a rotating advertisement system. That is to say, rather than providing a single advertisement across a large section of the audience (e.g., subscriber base of an MSO), advertisements are instead rotated within groups of viewers. For example, three different pizza restaurants may be featured. At a first advertisement break, a commercial for the first restaurant is presented; at a second advertisement break, an advertisement for the second restaurant is presented, and so forth in rotating fashion. In another alternative, a service area may be divided into one or more small groups based on e.g., geographic region and/or demographics. The advertisements which are rotated as discussed above, may be further rotated within the small groups.

For instance, a first group may be elected to receive advertisements from the first pizza restaurant at a first advertisement break, the first advertisement then moves to the second group at a second advertisement break, and so forth. Similarly, the second group may receive advertisements from the second pizza restaurant at a first advertisement break, and receive advertisements from the third pizza restaurant at the second advertisement break, etc. In this manner, a demand for the advertised goods/services is balanced across the groups. This mechanism is useful, for example, if in addition to the commercial, a coupon or discount is offered. Often, the demand for goods/services increases as the discount increases. While generally this is a good thing for the provider of the goods/services, at a certain point, the demand may be too high for the provider to reasonably be able to meet. The foregoing rotation system ensures that the audience is "pre-divided", therefore enabling the goods/services providers to provide the biggest discount possible based on an expected, but not overwhelming, demand. Moreover, such a scheme can be used to provide very fine granularity advertisement packages e.g., small businesses can purchase micro-ad runs tailored to the customer base they can support.

b. Participation Advertisements

In another aspect, a participation-based couponing system may be implemented using the systems and apparatus discussed above. In one embodiment, an advertisement for particular goods/services is provided to a group of subscribers. The advertisement offers a coupon or discount if a pre-determined number of people "purchase" the discounted goods/services (or a voucher for them). If the predetermined number of people is not met, the coupon or discount goods/services is discontinued.

It is further appreciated that a user may forward a message or the advertisement itself to one or more contacts (such as by subscriber lookup, manual entry, linking to other media sites, an address book feature, etc.) in order to entice these people to join coupon offer as well.

Alternatively, a tiered coupon may be provided. According to this embodiment, the amount of the discount is increased (or price of goods/services is decreased) based on the number of participants. For example, a 10% discount is given if 100 participants purchase the advertised goods/services, a 20% discount is given if 500 participants purchase the advertised goods/services, and so forth. In another embodiment, a greater discount may be given to those who purchase the goods/services early (e.g., the first 500 customers get 25% off).

In a further variant, an overlay to the advertisement may be displayed in order to provide information to the viewers regarding how many people have purchased the coupon, what tier the coupon is currently in, how many additional people are needed to make a next tier or to meet a threshold for causing the coupon to be activated. In one variant, the overlay is updated using information from the reporting application 204d and displayed each time the commercial is provided to the subscribers.

In a further embodiment, the previously referenced recommendation engine 222 may be employed to learn (and unlearn) a user's preferences so as to provide targeted advertisements only to those subscribers which are likely to be interested in the advertised product/service thereby increasing a chance of meeting the predetermined threshold of "purchasers" required for a discount.

c. Group Content Discount

In another embodiment, discounts for purchasable content (such as e.g., VOD, pay-per-view, content which is purchased for downloading and storing locally at a client device, etc.) may be provided using similar methods to those discussed above. In particular, a subscriber will receive a discount on a price paid for the purchasable content if that subscriber is able to get a set number of other subscribers to purchase the same or other purchasable content. In another embodiment, the entire group receives a discount for the purchasable content for participating in the event.

The subscriber may use the aforementioned look-up, manual entry, cross-reference to other media sites, etc. to identify and request participation from other subscribers (or non-subscribers).

In yet another embodiment, group discounts may be applied to the purchase of other purchasable items via the managed network (e.g., actual physical items purchased.).

d. Group Gaming

A group of subscribers may also be gathered to participate in a gaming event. In one embodiment, the gaming event comprises a scavenger hunt integrated to the television content (e.g., programming and/or advertising). According to this embodiment, game lists are stored (such as at the storage device 208 of FIG. 2). The randomizer 204b may randomly select individual subscribers to form a team, or the subscribers may play individually. Alternatively, subscribers may select the other subscribers with whom they would like to form a group (such as by using stored contacts, contacts linked from other media sources, etc.).

At the beginning of a user-selected (or randomly selected) program, each team member receives a list of items pertaining to the program and/or advertisements. As the subscribers view the program they are able to identify the items on the list and/or answer the questions using e.g., the subscriber's remote control buttons and/or devices in communication with the subscriber device such as keyboards, mouse, touch screen input, etc. In this manner, the system can track the subscriber's actual viewing of the program and the advertisements, and report these statistics to a headend entity using e.g., the reporting application 204d. Additionally, the reporting application 204d may be used to track each subscriber's progress, update the list with those items which have been "found" and indicate a winner from among the groups or individuals.

In another embodiment, the game comprises a trivia or test of knowledge game integrated to the television content. The content of the trivia game is related to the context of the currently viewed program and/or advertising. A plurality of trivia or knowledge questions associated to certain content are stored at e.g., the storage entity 208. After a subscriber designates to participate in the game, the questions are presented as the content is broadcast (or otherwise played such as from DVR or nDVR or VOD storage). Alternatively, the questions may be asked after the program has ended. Since the questions are randomized and/or presented throughout the broadcast (such as on a scrolling display on the bottom of the screen) and a pre-set amount of time is given for an answer to be submitted, it will not be possible for the subscriber to "cheat" such as by going to the Internet (as doing so would take far longer than an amount of time allotted for answering the questions).

For each participating subscriber, the reporting application 204d keeps track of questions asked, questions answered correctly, points, leader boards, etc. Subscriber "winners" as well as who is "in the lead" at a given moment may be displayed to all of the subscribers, or only to those participating. Such publication (using the publication application 204e) may entice other subscribers to participate. Ongoing or series content may have trivia contests spanning a season as well as individual show or episode winners.

Additionally, the trivia game may "telescope" to other related content. For example, a question regarding The Simpsons may prompt an advertisement, question, or link to the show Futurama, as these are at least related in genre, creators, type (animated), etc.

Prizes for winning a scavenger hunt, trivia, or other game may include, e.g., VOD or other MSO-based credits, coupons, billing credits, free products (such as those being advertised in conjunction with the gaming content), etc.

It is further noted that each of the above-disclosed group participation features can be accessible to user mobile devices (such as via e.g., the network architectures of FIGS. 2a-2c). Furthermore, it is appreciated that, in particular, the high bandwidth capabilities of the extant network advantageously enable the simultaneous participation of the groups as discussed above. In particular, information necessary for updating group events and discounts is advantageously transmitting using the aforementioned bandwidth capabilities.

Anonymous Interaction—

In another embodiment, the systems and methods of the present invention may be further utilized to enable anonymous interaction. For instance, each MSO-distributed CPE 106 (or third party consumer electronic device) is outfitted with a wireless transmitter 612 as illustrated in FIG. 6.

Figure 6:
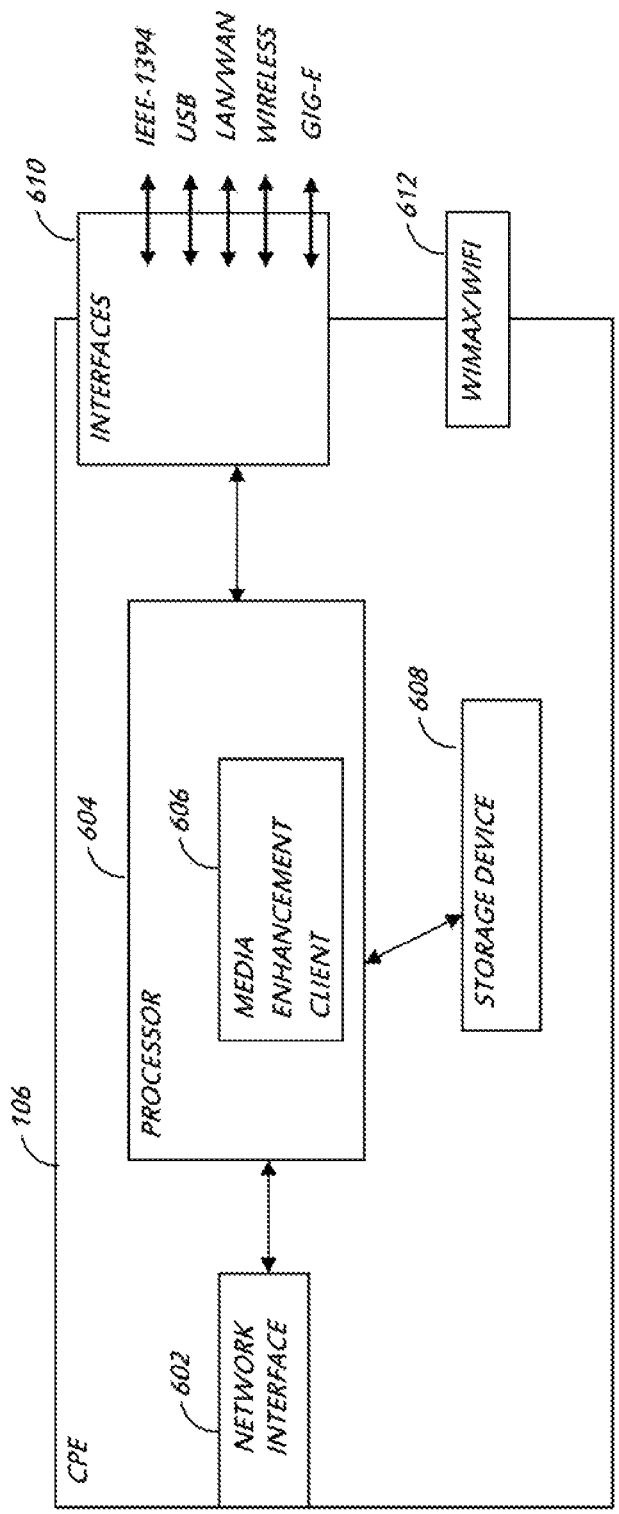
FIG. 6 is a functional block diagram illustrating an exemplary embodiment of consumer premises device according to the present invention.

As shown in FIG. 6, the CPE 106 or other device generally comprises a network interface 602 for interfacing with the content delivery network 101, a processor 604, a storage apparatus 608, and a plurality of interfaces 610 for direct or indirect communication with e.g., other CPE or network entities. The CPE 106 further comprises a media enhancement client 606 run on the processor thereof, which enables communication and interaction with the media enhancement server 202. The media enhancement client 606 may be downloaded to the CPE 106 or other device after installation in a subscriber's premises or network or may be pre-loaded on an MSO provided CPE 106.

In a further embodiment (not shown), the CPE 106 may be further configured to run a portion of the media enhancement applications 204 (as distributed applications) such as is illustrated in FIG. 2c.

The wireless transmitter 612 of the CPE 106 of FIG. 6 enables a portion of the device's allocated bandwidth to be reserved for e.g., general public use. This approach can be employed for example for WLAN (Wi-Fi), or WMAN (e.g., WiMAX) services. According to this embodiment, a subscriber is given an opportunity to pay for an MSO-managed data plan, and thus granted access to the allocated bandwidth anywhere that there is an MSO-provided CPE 106 nearby. Thus, the subscriber is granted access to wireless data via another subscriber's CPE 106. Hence, one MSO subscriber can anonymously "piggyback" on another's CPE or mobile device. Additionally, the system can be configured to identify the requesting subscriber as an MSO customer, and use the identifying information to bill the subscriber through his/her MSO bill.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A computerized method of enabling a plurality of users to actively participate with digitally rendered content delivered over a content delivery network, the computerized method comprising:

transmitting notification data to a plurality of computerized client devices respectively associated with the plurality of users, the notification data configured to cause display of a notification relating to an event, the event being enabled for participation and relating to particular digitally rendered content;

causing delivery of secondary event information in conjunction with the notification, the secondary event information comprising a recitation of one or more materials recommended for participation in the event;

causing delivery of the particular digitally rendered content to the plurality of computerized client devices; and enabling the plurality of users to interactively participate in the event via a distributed application, the interactive participation comprising at least one of interaction of individual ones of the plurality of users independent of other ones of the plurality of users, or interaction of individual ones of the plurality of users simultaneously with one another;

wherein the distributed application comprises respective portions thereof residing on the plurality of the computerized client devices and a media enhancement server apparatus of the content delivery network, and is configured to enable communication, between the plurality of the computerized client devices and the media enhancement server apparatus, to enable at least one of (i) modification of the particular digitally rendered content, or (ii) generation of user-created digitally rendered content, by the plurality of the computerized client devices for upload to a computerized entity of content delivery network.

2. The computerized method of claim 1, wherein:

the causing delivery of the particular digitally rendered content comprises causing delivery of digitally rendered video content having cooking as a context;

the one or more materials comprise one or more ingredients related to a recipe featured within the digitally rendered video content; and the causing delivery of the secondary event information comprises presenting a mechanism to the plurality of users to purchase the one or more ingredients, the mechanism comprising an Internet link.

3. The computerized method of claim 1, wherein the causing delivery of the secondary event information comprises presenting a mechanism to the plurality of users to purchase the one or more materials from a third party provider; and the computerized method further comprises:

enabling a purchase of the one or more materials by a user of the plurality of users to be billed collectively with a subscription of the user to the content delivery network.

4. The computerized method of claim 1, wherein the causing delivery of the secondary event information comprises delivery of an estimated start-to-finish duration of the event.

5. The computerized method of claim 1, further comprising:

scheduling a date and time for the delivery of the particular digitally rendered content related to the event, and enabling individual ones of the plurality of users to adjust the date and time for the delivery of the particular digitally rendered content to plurality of computerized client devices associated with the individual ones of the plurality of users.

6. The computerized method of claim 1, wherein the content delivery network comprises a managed content delivery network;

wherein the enabling the plurality of users to interactively participate in the event via the distributed application comprises enabling, via the distributed application, at least two of: real-time video, audio, or data services during the delivery of the particular digitally rendered content between at least some of the plurality of users; and wherein the enabling, via the distributed application, of the at least two of: real-time video, audio, or data services during the delivery of the particular digitally rendered content comprises combining at least two of video, voice and data services into a single session.

7. The computerized method of claim 1, wherein the causing delivery of the particular digitally rendered content comprises causing delivery of digitally rendered video content having an education context, and wherein the secondary event information further comprises testing materials.

8. The computerized method of claim 7, further comprising collecting viewing statistics data related to the event for performing at least one of (i) assessing student requirements or (ii) providing feedback on student study habits.

9. The computerized method of claim 1, wherein the plurality of the computerized client devices are respectively associated with a plurality of access networks, and each of the plurality of access networks provides provide access to the content delivery network;

and the computerized method further comprises:
integrating at least one of (i) the modified particular digitally rendered content, or (ii) the user-created digitally rendered content uploaded to the computerized entity of the content delivery network, with at least a portion of the particular digitally rendered content to generate a blended service; and
provide the blended service to the plurality of the computerized client devices via a single application, the single application configured to extend to different ones of the multiple access networks based on an IMS (IP Multimedia System) application layer applicable to each of the multiple access networks.

10. A computerized method for interaction of a plurality of subscribers to a content delivery network with a digitally rendered content element delivered over the content delivery network, the computerized method comprising:
determining a threshold number of subscribers required for participation in an event, the event being associated with the digitally rendered content element;
notifying the plurality of subscribers of the event associated with the digitally rendered content element;
enabling individual ones of the plurality of subscribers to designate an interest in a portion of the digitally rendered content element via the content delivery network;
generating a virtual content channel, the generating comprising combining the designated portions of the digitally rendered content element with other digitally rendered content that has a prescribed level of similarity to the designated portions of the digitally rendered content element; and
based at least on a number of the individual ones of the plurality of subscribers meeting the threshold number, causing the event to occur using the content delivery network for only the individual ones of the plurality of subscribers, the causing of the event comprising causing delivery of the virtual content channel to the individual ones of the plurality of subscribers.

11. The computerized method of claim 10, wherein the causing the event to occur comprises:
selecting two or more subscribers from the individual ones of the plurality of subscribers;
causing delivery of digital programming content over the content delivery network to the two or more subscribers; and
causing delivery of the digitally rendered content element over the content delivery network to the two or more subscribers during advertisement portions associated with the digital programming content, wherein the digitally rendered content element comprises a questionnaire.

12. The computerized method of claim 10, wherein the causing the event to occur comprises:
using a randomizer application to select two or more subscribers from the individual ones of the plurality of subscribers;
causing delivery of digital programming content over the content delivery network to the two or more subscribers; and
causing delivery of the digitally rendered content element to the two or more subscribers at least in part over the content delivery network, during the delivery of the digital programming content, wherein the digitally rendered content element enables real-time communication between the two or more subscribers.

13. The computerized method of claim 12, wherein the causing delivery of the digital programming content comprises:
using the randomizer application to at least partially randomly select first digital programming content and second digital programming content;
causing delivery of the first digital programming content to at least one of the two or more subscribers; and
causing delivery of the second digital programming content to at least one other of the two or more subscribers, wherein the first digital programming content is different from the second digital programming content.

14. The computerized method of claim 10, wherein the causing the event to occur comprises:
obtaining viewing patterns of the individual ones of the plurality of subscribers;
based on the viewing patterns, selecting two or more subscribers from the individual ones of the plurality of subscribers;
causing delivery of digital programming content over the content delivery network to the two or more subscribers; and
causing delivery of the digitally rendered content element to the two or more subscribers at least in part over the content delivery network, during the delivery of the digital programming content, wherein the digitally rendered content element enables real-time communication between the two or more subscribers.

15. The computerized method of claim 10, wherein the threshold number is determined by an advertiser; and wherein the causing the event to occur comprises providing a coupon or a discount from the advertiser to the individual ones of the plurality of subscribers.

16. The computerized method of claim 10, wherein said event comprises a gaming event, and said computerized method further comprises:
providing said individual ones of said plurality of subscribers a data structure indicating a plurality of items to be identified within playback of the digitally rendered content element; and
enabling said individual ones of said plurality of subscribers to identify or demarcate one or more of the plurality items from said data structure within said playback of the digitally rendered content element.

17. The computerized method of claim 10, wherein said event comprises a for-profit or not-for-profit gambling event, and said computerized method further comprises enabling said individual ones of said plurality of subscribers to engage in said event by placing wagers on one or more aspects of the digitally rendered content element.

18. The computerized method of claim 10, wherein the enabling of the individual ones of the plurality of subscribers to designate the interest in the portion of the digitally rendered content element comprises enabling of the individual ones of the plurality of subscribers (i) mark the portion of the digitally rendered content element by associating marker data with a starting and stopping point within the digitally rendered content element and (ii) upload the marker data; and the computerized method further comprises:
utilizing the marker data to identify the portion of the digitally rendered content element, and provide the portion of the digitally rendered content element from a single data source.

19. Computerized network apparatus configured to provide one or more enhanced interactive features to a plurality of users of a content delivery network, said computerized network apparatus comprising:
processor apparatus;
network interface apparatus in data communication with the processor apparatus; and
storage apparatus in data communication with the processor apparatus, the storage apparatus comprising at least one computer program configured to, when executed on the processor apparatus, cause the computerized network apparatus to:
determine a threshold number of user for participation in an event, the event being associated with network-sourced digitally rendered content;
receive data representative of one or more requests to participate in the event associated with individual ones of the plurality of users;
based at least on a number of the individual ones of the plurality of users meeting the threshold number, enable the individual ones of the plurality of users to upload user-generated content; and
enable only the individual ones of the plurality of users to participate in the event, the enablement of participation comprising delivery of a blended service to one or more of the individual ones of the plurality of users, the blended service comprising at least a portion of the network-sourced digitally rendered content and the user-generated content converged into a single, substantially unified service platform.

20. The computerized network apparatus of claim 19, wherein:
the at least one computer program is further configured to, when executed on the processor apparatus, cause the computerized network apparatus to:
enable at least a first one of the individual ones of the plurality of users to, via a distributed application, manipulate one or more aspects of the digitally rendered content to generate a manipulated version of the digitally rendered content; and
wherein the blended service further comprises the manipulated version of the digitally rendered content converged with the at least portion of the network-sourced digitally rendered content and the user-generated content into the single, substantially unified service platform.

21. The computerized network apparatus of claim 20, wherein:
said distributed application comprises respective portions thereof residing on a computerized client device of the individual ones of the plurality of users and a media enhancement server apparatus, said distributed application configured to enable negotiation, between said computerized client device and said media enhancement server apparatus, to determine a media application type; and
said media application type is configured to determine an Internet Protocol (IP) layer routing from said media enhancement server apparatus to one or more other server apparatus, said one or more other server apparatus comprising one or more sources of a live broadcast of said digitally rendered content and at least one advertisement associated therewith, respectively.

22. The computerized network apparatus of claim 20, wherein said generation of said manipulated version of the digitally rendered content comprises a blending of one or more heterogeneous services together at a headend of a managed network to provide the blended service to the individual ones of the plurality of users such that said one or more heterogeneous services are converged into a common control layer, the one or more heterogeneous services comprising at least the at least portion of the network-sourced digitally rendered content and the user-generated content, and said manipulated version of the digitally rendered content.

23. The computerized network apparatus of claim 21, wherein:
delivery of the blended service to the one or more of the individual ones of the plurality of users comprises a stream of an overlay of at least one of: video, audio, of text associated with the at least portion of the user-generated content to be displayed concurrently with the at least portion of the network-sourced digitally rendered content, the stream of the overlay having delivery requirements separate from delivery requirements of the at least portion of the network-sourced digitally rendered content; and
the delivery requirements of the stream are based on Media Access Control (MAC) information specified by the media application type.

24. The computerized network apparatus of claim 19, wherein the at least one computer program is further configured to, when executed on the processor apparatus, cause the computerized network apparatus to:
transmit notification data to the individual ones of the plurality of users, the notification data configured to cause display of a notification relating to the event, and wherein the notification relating to the event comprises an indication of one or more elements requisite for the participation in the event.

\* \* \* \* \*